US012699965B1

(12) United States Patent
Andersen et al.

(10) Patent No.: US 12,699,965 B1
(45) Date of Patent: Aug. 4, 2026

(54) HUMAN RESOURCES MANAGEMENT SYSTEM ENHANCING EMPLOYMENT OPPORTUNITY, FAIRNESS, TRANSPARENCY AND PRODUCTIVITY

(71) Applicant: GOALZETTER LLC, Brooklyn, NY (US)

(72) Inventors: Anna-Cathrine Willaume Andersen, Copenhagen (DK); Christopher V Beckman, Newport Beach, CA (US)

( * ) Notice: Subject to any disclaimer, the term of this patent is extended or adjusted under 35 U.S.C. 154(b) by 0 days.

(21) Appl. No.: 19/333,263

(22) Filed: Sep. 18, 2025

(51) Int. Cl.
    *G06Q 30/00*     (2023.01)
    *G06Q 10/1053*     (2023.01)

(52) U.S. Cl.
    CPC .............................. *G06Q 10/1053* (2013.01)

(58) Field of Classification Search
    None
    See application file for complete search history.

(56) References Cited

U.S. PATENT DOCUMENTS

| | | |
|---|---|---|
| 8,244,551 B1 | 8/2012 | Mund |
| 8,503,924 B2 | 8/2013 | Dion |
| 8,527,510 B2 | 9/2013 | Chen et al. |
| 8,799,243 B1 | 8/2014 | Havlik |
| 9,811,807 B2 | 11/2017 | Gune et al. |
| 2013/0290200 A1 | 10/2013 | Singhal et al. |
| 2014/0013252 A1 | 1/2014 | Ehrler et al. |
| 2014/0074739 A1 | 3/2014 | Rammohan |

(Continued)

FOREIGN PATENT DOCUMENTS

| | | |
|---|---|---|
| CN | 117575825 A | 2/2024 |
| JP | 2015138444 A | 7/2015 |

OTHER PUBLICATIONS

"IEEE/UL Standard for Clinical Internet of Things (IoT) Data and Device Interoperability with TIPPSS—Trust, Identity, Privacy, Protection, Safety, and Security," in IEEE Std 2933-2024/UL 2933:2024 (Year: 2024).*

(Continued)

*Primary Examiner* — Matthew T Sittner
(74) *Attorney, Agent, or Firm* — BECKMAN LAW P.C.; Christopher Beckman

(57) ABSTRACT

New systems, devices and methods are provided for enhancing opportunity, fairness and productivity in employment and at a workplace. In some embodiments, a unique new form of employment-related platform is provided, which is known as an employment opportunity enhancement system (an "EOES system" or a "GoalZetter system") implementing specialized computer hardware and software to foster fair and transparent workplace opportunities. In some embodiments, an EOES system includes multiple, mutually-synergistic components, which may include: 1) a hiring information filtration, redaction and representation component; 2) a lost employment opportunity and bias monitoring component; 3) a lost employment opportunity and bias reporting component; 4) a multi-channel business communications monitoring sub-system; 5) a legal and regulatory compliance guidance and insurance component; and 6) a ratings engine, for generating one or more rating(s) quantifying a business' successful cultivation of opportunity, fairness and productivity in a workplace.

20 Claims, 13 Drawing Sheets

(56) References Cited

U.S. PATENT DOCUMENTS

| | | | |
|---|---|---|---|
| 2014/0129271 | A1 | 5/2014 | Rangaswamy et al. |
| 2014/0289141 | A1 | 9/2014 | Kolber et al. |
| 2015/0073823 | A1 | 3/2015 | Ladd et al. |
| 2016/0314418 | A1* | 10/2016 | Varghese .......... G06Q 10/0635 |
| 2017/0154314 | A1* | 6/2017 | Mones ............... G06Q 10/1053 |
| 2017/0308534 | A1 | 10/2017 | Ramirez et al. |
| 2018/0060823 | A1 | 3/2018 | Garimella et al. |
| 2019/0026334 | A1 | 1/2019 | Ma et al. |
| 2019/0066056 | A1* | 2/2019 | Gomez ........... G06Q 10/06393 |
| 2019/0102742 | A1 | 4/2019 | Agrawal et al. |
| 2019/0325372 | A1 | 10/2019 | Shannon et al. |
| 2020/0143329 | A1 | 5/2020 | Gamaliel |
| 2021/0141932 | A1 | 5/2021 | Barday et al. |
| 2023/0068203 | A1 | 3/2023 | Yin |
| 2023/0161973 | A1* | 5/2023 | Heo ........................ G06F 40/30 704/9 |
| 2023/0222378 | A1* | 7/2023 | Romaniello .......... G06Q 40/03 706/12 |
| 2023/0401535 | A1 | 12/2023 | Talbot |
| 2024/0119422 | A1* | 4/2024 | Olson ................... A61B 5/378 |
| 2024/0265350 | A1 | 8/2024 | Muralikrishnan et al. |
| 2024/0412720 | A1* | 12/2024 | Vasylyev .......... G06F 16/90332 |
| 2025/0124392 | A1 | 4/2025 | Gibbs Djibom |
| 2025/0131365 | A1 | 4/2025 | Dangi et al. |

OTHER PUBLICATIONS

D. Saraswat et al., "Explainable AI for Healthcare 5.0: Opportunities and Challenges," in IEEE Access, vol. 10, pp. 84486-84517, 2022 (Year: 2022).*

* cited by examiner

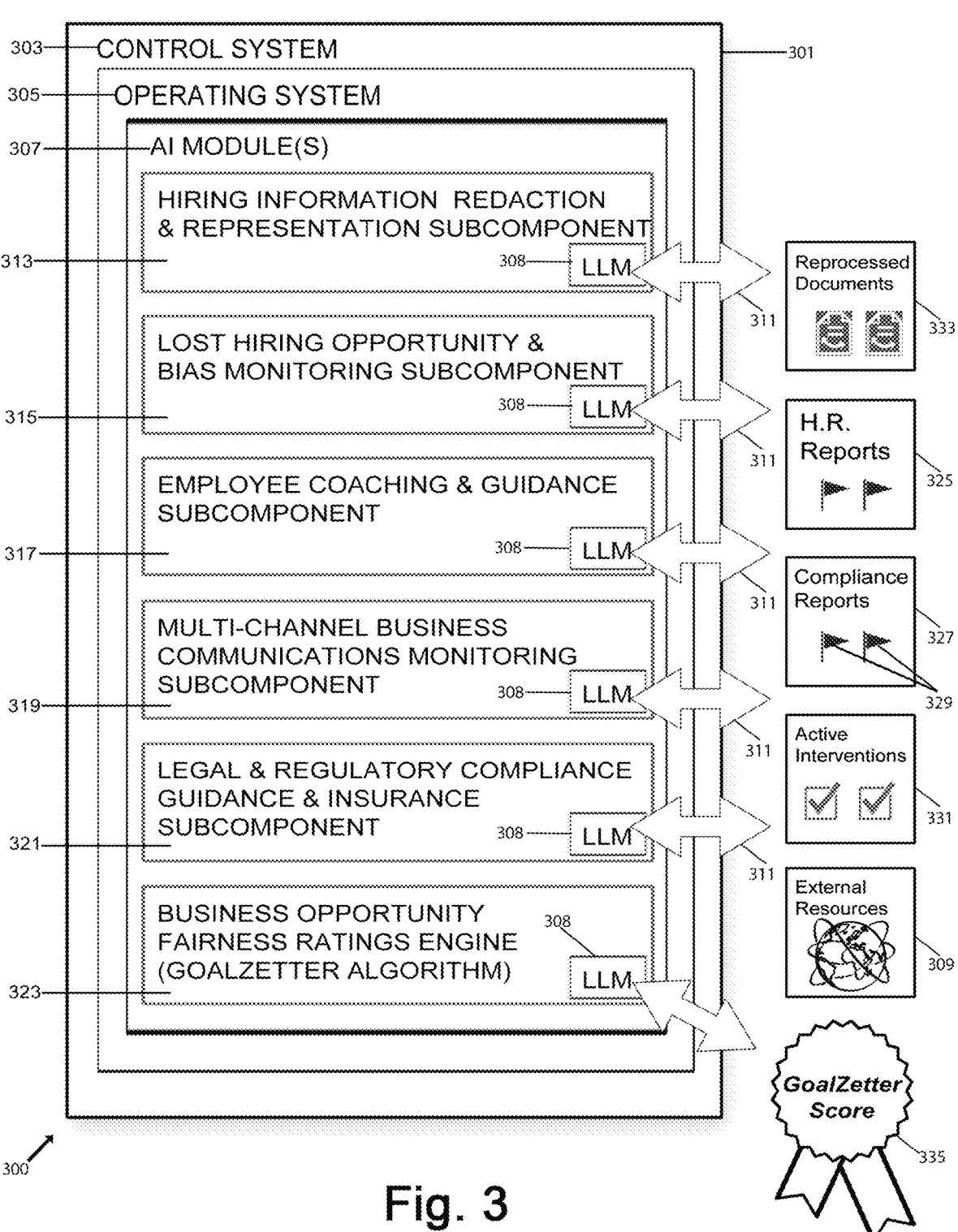

303 — CONTROL SYSTEM
301
305 — OPERATING SYSTEM
307 — AI MODULE(S)

HIRING INFORMATION  REDACTION & REPRESENTATION SUBCOMPONENT
313
308 — LLM

LOST HIRING OPPORTUNITY & BIAS MONITORING SUBCOMPONENT
315
308 — LLM

EMPLOYEE COACHING & GUIDANCE SUBCOMPONENT
317
308 — LLM

MULTI-CHANNEL BUSINESS COMMUNICATIONS MONITORING SUBCOMPONENT
319
308 — LLM

LEGAL & REGULATORY COMPLIANCE GUIDANCE & INSURANCE SUBCOMPONENT
321
308 — LLM

BUSINESS OPPORTUNITY FAIRNESS RATINGS ENGINE (GOALZETTER ALGORITHM)
323
308
LLM

311

Reprocessed Documents
333

H.R. Reports
325

Compliance Reports
327
329

Active Interventions
331

External Resources
309

GoalZetter Score
335

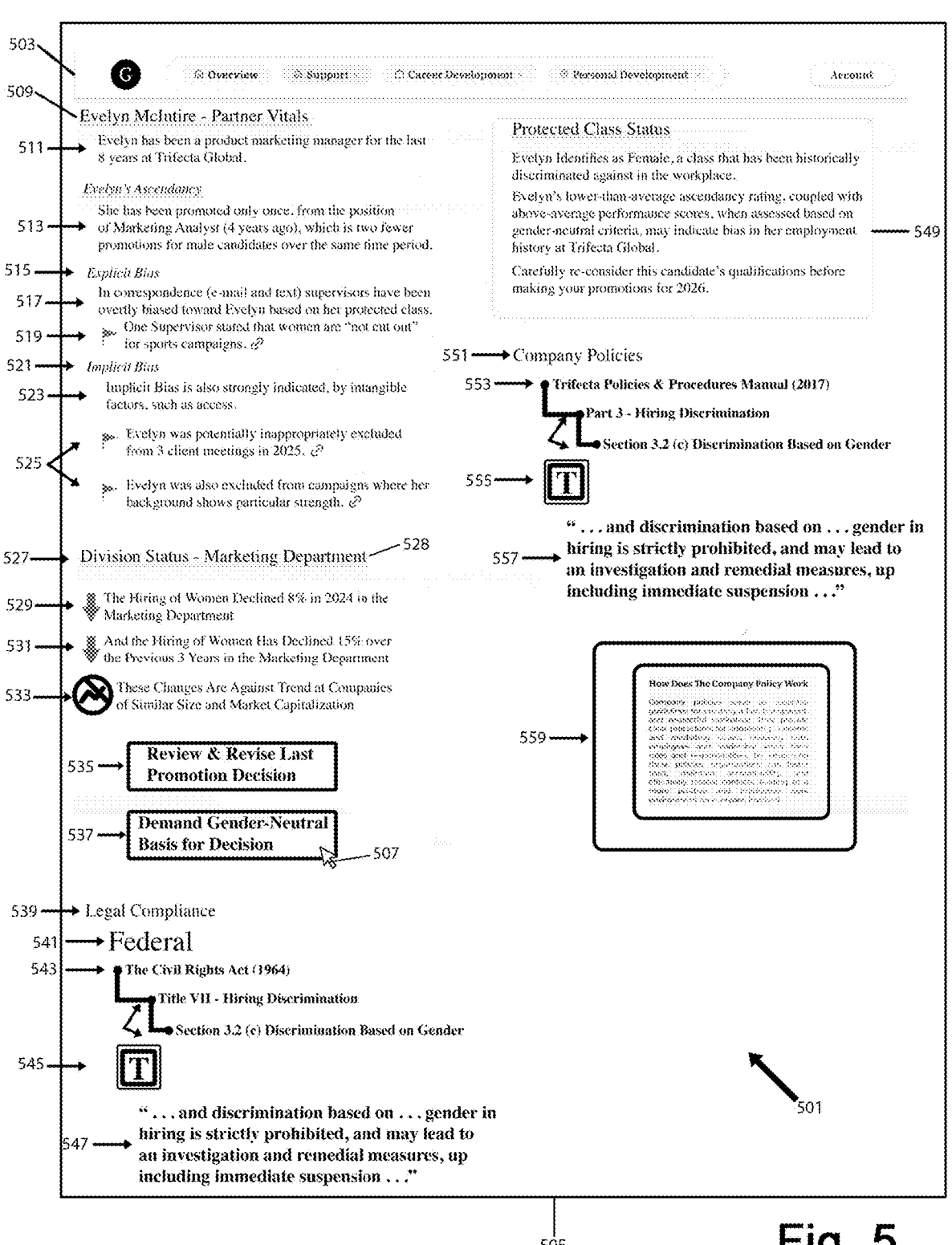

Evelyn McIntire - Partner Vitals

Evelyn has been a product marketing manager for the last 8 years at Trifecta Global.

*Evelyn's Ascendancy*

She has been promoted only once, from the position of Marketing Analyst (4 years ago), which is two fewer promotions for male candidates over the same time period.

*Explicit Bias*

In correspondence (e-mail and text) supervisors have been overtly biased toward Evelyn based on her protected class.

➤ One Supervisor stated that women are "not cut out" for sports campaigns. ⬡

*Implicit Bias*

Implicit Bias is also strongly indicated, by intangible factors, such as access.

➤ Evelyn was potentially inappropriately excluded from 3 client meetings in 2025. ⬡

➤ Evelyn was also excluded from campaigns where her background shows particular strength. ⬡

Division Status - Marketing Department

The Hiring of Women Declined 8% in 2024 in the Marketing Department

And the Hiring of Women Has Declined 15% over the Previous 3 Years in the Marketing Department These Changes Are Against Trend at Companies of Similar Size and Market Capitalization

Review & Revise Last Promotion Decision

Demand Gender-Neutral Basis for Decision

Legal Compliance

Federal

The Civil Rights Act (1964)

Title VII - Hiring Discrimination

Section 3.2 (c) Discrimination Based on Gender

" . . . and discrimination based on . . . gender in hiring is strictly prohibited, and may lead to an investigation and remedial measures, up including immediate suspension . . ."

Protected Class Status

Evelyn Identifies as Female, a class that has been historically discriminated against in the workplace.

Evelyn's lower-than-average ascendancy rating, coupled with above-average performance scores, when assessed based on gender-neutral criteria, may indicate bias in her employment history at Trifecta Global.

Carefully re-consider this candidate's qualifications before making your promotions for 2026.

Company Policies

Trifecta Policies & Procedures Manual (2017)

Part 3 - Hiring Discrimination

Section 3.2 (c) Discrimination Based on Gender

" . . . and discrimination based on . . . gender in hiring is strictly prohibited, and may lead to an investigation and remedial measures, up including immediate suspension . . ."

How Does The Company Policy Work

Fig. 5

Overview   Support   Career Development   Personal Development     Account

Virtual Whistleblower

Dear manager,

The A.I. employment system has detected
likely act of unlawful discrimination. ◄—903
Please investigate the following:

907

Dossier

On February 28, 2025, marketing manager
Evelyn McEntire was excluded from a pre-planned
meeting of her assigned team.
909

─────► She was available, and received no notice of the meeting. ◄—911

─────► The meeting was properly within the scope of her duties. ◄—911

─────► Evelyn is a female manager, with a recently born child,
       a class of employees historically discriminated against at the company.

905

Follow-up

913—— | Schedule meeting with Team Leader | | Send Private Inquiries to Team Members | ——913

901

Fig. 9

HUMAN RESOURCES MANAGEMENT SYSTEM ENHANCING EMPLOYMENT OPPORTUNITY, FAIRNESS, TRANSPARENCY AND PRODUCTIVITY

INTELLECTUAL PROPERTY NOTICE

FIELD OF THE INVENTION

The present disclosures relate to new systems, devices and methods for enhancing opportunity, fairness and productivity in employment and at a workplace. The present application also relates to assessing businesses' awareness of their performance as employers, and their employees' work performance and satisfaction.

BACKGROUND

The history of employment predates recorded history, but likely began with very few, informal rules, if any, created by early hunter-gatherer human societies. For example, evidence exists that *Homo sapiens* hunting parties some 200,000 years ago tended to have specialized jobs for different individuals, based on their social rank, skills, age and gender. However, this division of labor was largely informal.

As hunter-gatherer societies evolved and early agrarian civilizations formed, specialized labor greatly increased, and became more formalized. The first major human civilization with written laws was probably ancient Sumer, in Mesopotamia, within the Fertile Crescent where civilization took root. In Sumer, already, workers' and employers' rights were set in the clay tablets of the Code of Hammurabi. Even in these early laws, the ideal of equal treatment for similarly situated workers was present. Yet grave unfairnesses, including slavery, were commonplace. Put simply, laws have never been enforced perfectly. And, even in advanced civilizations that embrace ideals of equal protection for all citizens, powerful special interests tend to erode equal protection through lobbying-applying political influence for seemingly neutral special exceptions that are actually in their favor, in ways that can be difficult to detect. Such lobbying and special exceptions have persisted no matter how clear the ideals, even in the modern era.

After the industrial revolution, the dangers of unfair working conditions became amplified and more complex. The concentration of work forces in cities, and machine-driven workplaces increased the risk of major accidents. Typically, when major accidents occur, governments react with new, focused legislation, increasing safety and workplace fairness. For example, in 1911, the Triangle Shirtwaist Factory Fire in New York City drove such reactive, specific legislation. This fire cost 146 lives in New York City when management at the factory locked exits from the building in an effort to maximize productivity and deter employee theft.

In the aftermath, new fire safety laws were created to prohibit similar practices, and reduce casualties in industrial fires. While laudable, focused legislative efforts in the wake of adverse events tends to create more confusing and expensive complexity than proactive, comprehensive and forward-looking legislation.

By some measures, U.S. companies spend between 1.3 and 3.3 percent of their employment budget on regulatory compliance. See, e.g., Francesco Trebbi et al., *The Cost of Regulatory Compliance in the United States* (The Cato Institute, Jan. 24, 2024). But the costs of non-compliance are much higher, both in legal and practical terms. The lack of transparency and equal opportunity in career opportunities is extremely significant, and difficult to quantify. For example, the United Kingdom estimates that ethnic discrimination in the workplace costs about $40 billion per year, but the downstream costs are too complex to assess and certainly far greater. When a candidate is discriminated against, either in a hiring or promotion decision, two things happen: 1) one person more suitable for a position is not employed in that position, and typically remains less productively employed elsewhere; and 2) another person, with lower qualifications, is put in that position, where they are less productive, and/or, in some cases, even destructive. These two effects can be thought of as underemployment and overemployment costs of discrimination, respectively. But many more complex negative effects also flow from discriminatory hiring, such as reduced employee morale and bad will against the employer as workers and the public observe the unfair hiring practices.

Employers use a wide variety of computer systems and software applications to aid in administering their employment programs. To aid in managing their business, companies may develop an enterprise resource planning system ("ERP"), a mainframe or another main business system, which may include computer hardware and software. And, in many cases, larger businesses will also develop additional systems and subsystems, for specialized business functions. For example, a company may use separate systems or sub-systems for payroll, communications, legal services, accounting, customer service, logistics, finance, and management (each, a "Business Subsystem"). In addition, companies may use third-party desktop and/or smartphone software applications, if required by their partners and vendors. Some such third parties may provide and connect their own applications (e.g., through a temporary network connection or an application programming interface ("API")), to those Business Subsystems, in order to aid in recruiting, payroll and legal compliance. There is no general consensus in the employment industry as to which systems and third-party applications are best, and new options emerge regularly. As a result, it can be very difficult to monitor and understand critical communications and business statuses across so many different Business Subsystems and applications.

There remains a long-felt need for improved employment systems and software.

It should be understood that the disclosures in this application related to the background of the invention, in, but not limited to this section titled "Background," do not necessarily set forth prior art or other known aspects exclusively, and may instead include art that was invented concurrently or after the present invention and conception, and details of this application's inventors' own discoveries and work and work results.

SUMMARY OF THE INVENTION

New systems, devices and methods are provided for enhancing opportunity, fairness and productivity in employment and at a workplace. In some embodiments, a unique new form of employment-related software as a service ("SaaS") platform is provided, which is known as an employment opportunity enhancement system (an "EOES system" or a "GoalZetter system") implementing specialized computer hardware and software to foster fair and transparent workplace opportunities. Embodiments of such an EOES system are capable of operating in a wide variety of business contexts, ranging from small, local businesses to companies in the most complex, highly-regulated industries.

In some embodiments, an EOES system includes multiple, mutually-synergistic components, which may include: 1) a hiring information filtration, redaction and representation component; 2) a lost employment opportunity and bias monitoring component; 3) an employee coaching and guidance component including a chat feature; 4) a multi-channel business communications monitoring sub-system; 5) a legal and regulatory compliance guidance and insurance component; and 6) a ratings engine, for generating one or more rating(s) quantifying a business' successful cultivation of opportunity, fairness and productivity in a workplace. The unique, useful functions of each of the above components will be discussed in further detail, below. And, in various embodiments, each of the above components includes special graphical user interface ("GUI") tools, sub-tools and other useful new structures and devices for carrying out their functions.

Generally speaking, the above components aid in monitoring and managing employment related decisions and actions, human resources and employee performance, and employee development and inclusion within a business. In various embodiments of the present inventions, an EOES system aids in providing opportunities for employment and career advancement to current employees and/or other persons best suited for a position based on their qualifications, as will be explained in greater detail below. For example, in some embodiments, such an EOES system aids in establishing an employment practice known as "right-placing," meaning techniques for ensuring that the most suitable candidates for a position, apart from any irrelevant demographic considerations, are being successfully placed in that position. And, in some embodiments, such an EOES system aids in establishing an employment practice known as "specific cultivation," cultivating fulfilling growth opportunities for employees and employers alike, and cultivating the development of employees in ways that are increasingly specific to individual employee and employer needs.

In some embodiments, the EOES system aids recruiters, hiring managers, business leadership and other human resources personnel in understanding and improving the performance of their business in at least three different respects: 1) the availability and equality of employment and career development opportunities; 2) the legal compliance of their business with employment and human resource laws and regulations; and 3) business costs associated with the former two respects, including, but not limited to, opportunity costs and legal exposure (e.g., damages and regulatory fines). And in some embodiments, an EOES system aids business administrative users in setting attainable, advantageous goals for all three of the above in connection with their businesses, and assesses whether such goals have been met at regular intervals. In some embodiments, the EOES system generates unique key performance indicators ("KPI's") and one or more ratings for such a business, which indicate how well the business is achieving its goals. For example, in some embodiments, a ratings engine component, or part thereof, of the EOES system generates a target KPI related to demographics at the business. In some such embodiments, such a ratings engine component or part thereof includes a demographics engine, including separate group identity status assessment data and indicators repositories. In some such embodiments, such repositories each include separate, dedicated and encrypted files including data gathered by the EOES system related to data and indicators for a separate employee and other personnel of the business. In some embodiments, such separate, dedicated and encrypted files include linguistic data and indicators of group identity status, based on communications to and from, and otherwise related to, a given employee or other person, which correlates with a particular group status. For example, some language and language forms, such as discussed topics or vernacular and slang, are more commonly used among members of an ethnic minority or other group that has historically been the subject of discrimination. In any event, an AI subsystem of the EOES system may then assign a presumptive group status identity to such an employee or other person, based on those linguistic data and indicators of group identity status (e.g., identifying the person as "African American," or "female," where their language usage is close to that of Ebonics, or the interests discussed by that person are more common among women) in addition to formal designations of group identity status based, for example, on surveying such persons. In some such embodiments, the AI subsystem may include a large language learning module ("LLM"), which may compare such language used in connection with the person to patterns of language used by persons labelled as belonging to such groups, historically, and identify the person as belonging to such a group based on the degree of correlation in language usage or probability that the person is a member of that group exceeding a particular threshold (e.g., 50% correlation or 80% probability). The demographics engine may then, by comparing the population within the business, work histories, promotions, inclusion and other treatment of such persons belonging to such groups, with those of other groups not subject to historic discrimination, both inside the business and at other, similar businesses, to determine one or more demographics related to diversity, equity and inclusion for the business. And, in some such embodiments, the EOES system includes a demographics target KPI indicator generator, which may include specialized hardware and software which calculates and/or determines a KPI target based, at least in part, on such demographics. For example, in some embodiments, such a KPI indicator generator may determine that such demographics related to other groups not subject to historic discrimination, both inside the business and at other, similar businesses, are a target KPI for the business (e.g., such a generator including and performing statistics based on a database generating actual and potential groups with which each employee and other person related to the business is associated). However, in some embodiments, the business itself, or a third party, may designate such a target KPI, at least in part (e.g., based on the KPI generated by the demographics target KPI indicator generator). In some such embodiments, such a ratings engine, demographics target KPI indicator generator and target KPI relate to decision-making and opportunities provided to employees or other persons related to the business who are members of such groups historically subjected to discrimination, as compared to decision-making affecting and opportunities provided to other persons. In some such embodiments, the EOES system and/or includes a human resources demographics decision register, which includes a matrix of records and indicators of such decisions affecting and opportunities provided to such other persons. In some embodiments, the ratings engine includes a comparison software module including a correlation generator, configured to compare resulting demographics from a hiring decision to a demographics target KPI generated by said demographics target key performance indicator (KPI) generator. And, depending on whether the comparison software module indicates such a correlation within particular pre-selected thresholds (e.g., 15, 20, 30 or 50%) a different score may be generated by the comparison software module (e.g., A, AA, B and BB, respectively) and reported to one or more executives of the business, as will be discussed in greater detail below. In some embodiments, the comparison software module generates a positive, or more positive, score based on whether demographics related to the business exceed the target KPI. And, in some embodiments, the comparison software module generates a positive score based on whether the resulting demographics from a hiring decision exceed the target KPI.

In some embodiments, the EOES system itself initiates and takes additional steps (e.g., through an execution of particular steps and/or implementing an AI agent) to improve the business in these respects, known as "active interventions." Furthermore, although the EOES system periodically reports and takes additional, active interventions at regular intervals, in some embodiments, the EOES system generates ad hoc reports and active interventions, in real time, based on the multi-channel business communications monitoring sub-system—for example, based on detecting "red flags."

In some embodiments, EOES systems in accordance with the present inventions implement artificial intelligence ("AI") sub-systems and/or modules, which include specialized computer hardware and software which apply one or more algorithm(s) assessing whether and the degree to which, employment opportunities are available and being accessed by employees, based on business communications, documentation and other evidence produced during the operation of the business. In some embodiments, such an AI sub-system includes a neural network, implementing a large language model ("LLM"), which may be trained on data related to prior business communications, documentation and other evidence associated with different employment-related activities associated with successful and unsuccessful employment outcomes. In some such embodiments, such a successful employment outcome includes hiring activity, or a hiring pattern, demonstrating transparency, fair access to employment opportunities, and improved earnings and operational effectiveness. In some embodiments, users of the EOES system may aid in such LLM training by labelling past recorded business communications, documentation and other evidence as including red flags or resulting in inequitable employment actions, among other approaches to LLM training. And, in some embodiments, such an EOES system itself generates specialized communications, documentation and other evidence, with the aid of such an LLM.

The present application also relates to assessing and improving businesses' awareness of their performance as employers, and their employees' performance and satisfaction. For example, as mentioned above, in some embodiments, the EOES system generates KPIs and/or ratings, which may be shared with human resources personnel and management executives, and some KPIs and ratings so generated may relate to employee performance and satisfaction metrics and other analysis. As another example, in some embodiments, the EOES system generates alerts and interventions when an aspect of the EOES system, such as an AI sub-system, identifies red flags and inequitable employment actions in business communications, documentation and other evidence.

In some embodiments, one or more scores may be generated, based on, among other factors: a) the degree to which a business has attained or exceeded its performance goals with respect to providing equal employment opportunities; b) whether the business has achieved employee demographics representative of a pool of employee candidates, or in a larger population; c) the legal compliance of the business with employment and human resource laws and regulations; d) increased revenue and opportunity associated with "right-placing," meaning that the most suitable candidates for a position, apart from any irrelevant demographic considerations, are being successfully placed in that position; and e) increased revenue and opportunity from "active interventions," meaning additional steps taken to improve transparency and fair access to employment opportunities. Such a score may be referred to as a "GoalZetter Score," in some embodiments.

In some embodiments, a chat-bot, or other colloquy generating AI sub-system is included in the EOES System. In some embodiments, the colloquy generating AI sub-system includes an algorithm creating one or more inquiries of employers and employees, identifying the presence of unfair bias and opaqueness in employment opportunity based on based on past equal opportunity indicating language and sentiment analysis. And, in some such embodiments, the algorithm may be determined and modified by an LLM based on training and experience, which may determine the identity and weighting of relevant variables for such an algorithm. In some embodiments, an AI agent implements interviewing techniques in such a colloquy by generating questions and statements via dynamic script generation and a text-to-speech sub-system, and by analyzing responses by employees through a speech-to-text sub-system and text analysis subsystem.

In some embodiments, the EOES system includes a bias reduction subsystem, which eliminates the consideration of certain information, such as visual appearance, circumstantial demographic information and personal voice-based data, in making certain types of employment or other business decisions.

In some embodiments, the EOES system includes multiple control systems and/or peripheral devices (such as a desktop computer and/or a smartphone, with each with their own software application(s), in accordance with aspects of the inventions set forth herein) comprising or comprised in the control system of the EOES system. And the control systems, peripheral device(s) and/or EOES system may communicate with other systems, such as an external, off-premises aspect of the EOES system and/or an enterprise resource planning system ("ERP"), in various embodiments. Thus, in some embodiments the EOES system may communicate with, coordinate and control external systems, having additional control systems and components, as set forth in the present application, in some such embodiments, to manage hiring, career development, and other human resources and business operations being controlled by such external systems. It should be noted that aspects of the invention are not limited to the employment and human resources contexts.

In some embodiments, the inventions set forth in this Application are implemented as a comprehensive, all-inclusive control system.

7

8

Canons of Construction

Where any term having multiple possible meanings, based on a reasonable interpretation, is set forth in a sentence, clause or other statement (a "statement") in this application, this application should be read as if each such reasonably possible meaning, significance and/or sense of each and every such term and statement is separately, conjunctively and alternatively set forth in additional alternative statement(s) thereafter.

It should also be understood that, for convenience and readability, this application may set forth particular pronouns and other linguistic qualifiers of various specific gender and number, but, where this occurs, this application should be read as if each other gender and number is separately, conjunctively and alternatively set forth in additional alternative statement(s) thereafter.

The embodiments set forth in detail in this application are to ease the reader's understanding of inventions set forth herein and, as such, are only examples of the virtually innumerable alternative embodiments falling within the scope of the application. No specific embodiment set forth in this application should be read as limiting the scope of any claimed inventions; the inventions of the present application are not limited to any particular preferred embodiment disclosed.

These and other aspects of the invention will be made clearer below, in other parts of this application. This Summary, the Abstract, and other parts of the application, are for ease of understanding only, and no part of this application should be read to limit the scope of the invention, whether or not it references matter also set forth in any other part. Further aspects of the invention will be set forth in greater detail, below, with reference to the particular figures.

BRIEF DESCRIPTION OF THE DRAWINGS

The features and advantages of example embodiments of the invention presented herein will become more apparent from the detailed description set forth below when taken in conjunction with the following drawings.

FIG. 3 is a diagram of example major system components and modules of an example EOES system, which may comprise, or be comprised within, a control system and/or computer hardware, such as the control system set forth in reference to FIG. 3, below, in accordance with some embodiments.

FIG. 5 depicts an example graphical user interface ("GUI") which may be included in an EOES system including, but not limited to, a control system having computer hardware and software, such as the example control system set forth in reference to FIG. 4, above, to carry out aspects of the present inventions related to human resources management, in accordance with some embodiments.

FIG. 9 depicts another example graphical user interface ("GUI") which may be included in an EOES system, to carry out additional aspects of the present inventions related to virtual whistleblowing, in accordance with some embodiments.

DETAILED DESCRIPTION OF THE INVENTION

Figure 1:
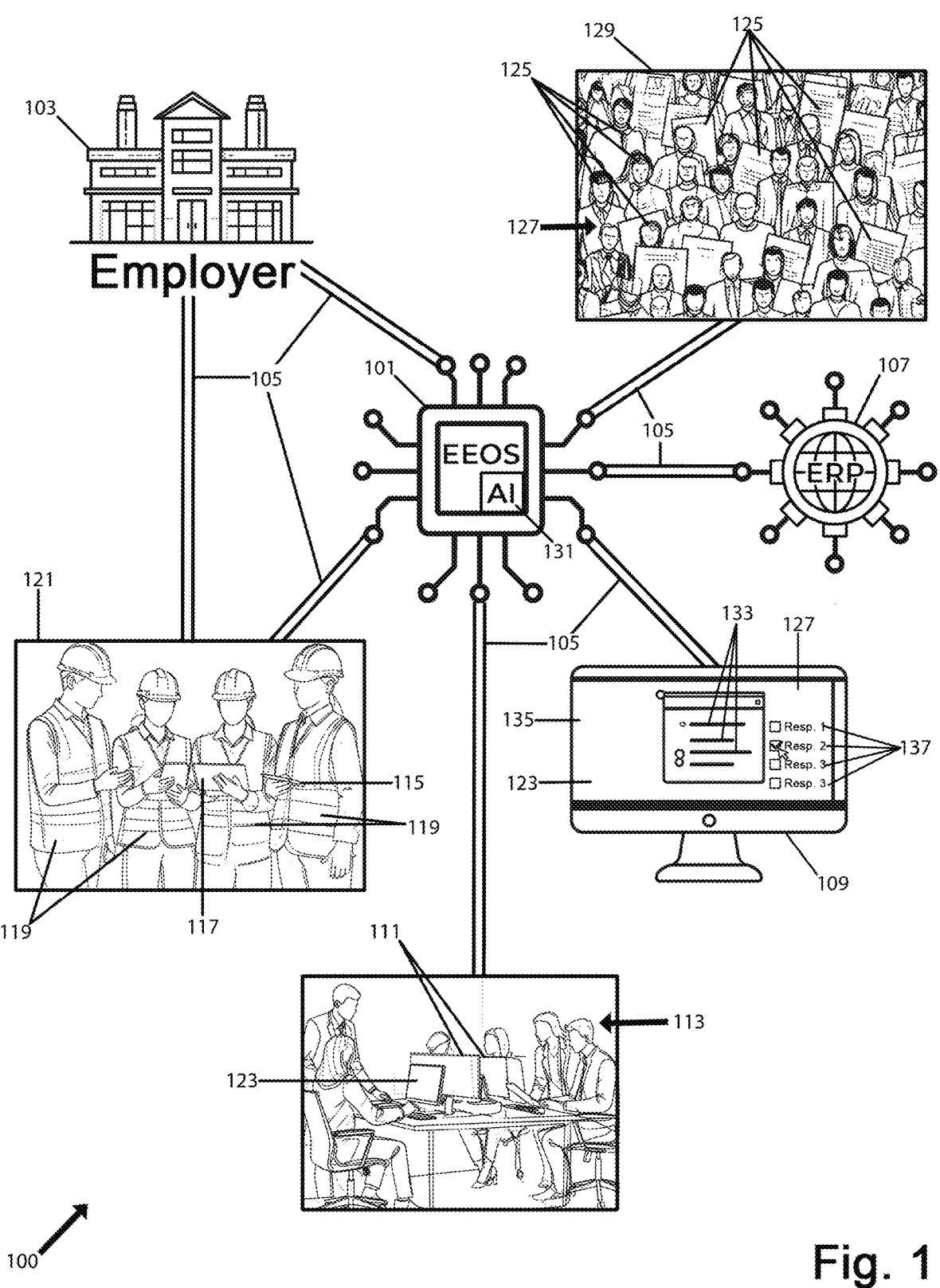
FIG. 1 depicts an example implementation environment for a unique new form of employment-related platform, referred to as an employment opportunity enhancement system (an "EOES system"), in accordance with some example embodiments of the invention(s).

The features and advantages of example embodiments of the invention presented herein are directed to new systems, devices and methods for employment application review, interpretation, management and tracking—and, in particular, for the filtering and analysis of candidates relative to a wide variety of employment positions presented by virtually unlimited numbers and types of employers. These and other aspects will become more apparent from the detailed description set forth below when taken in conjunction with the drawings. This description is not intended to limit the application to the embodiments presented herein, which are only examples of the virtually unlimited possible embodiments falling within the scope of the present application. In fact, after reading the following description, it will be apparent to one skilled in the relevant art(s) how to implement the following example embodiments in alternative embodiments, including any possible order, number or other arrangement of components and subcomponents, and in widely varying contexts (the following orders, components, subcomponents, relationships and contexts being non-limiting).

Embodiments of management systems including, but not limited to, a control system including computer hardware and software, carrying out example communications control techniques, and methods for their use in accordance with some aspects set forth in this Specification are depicted in FIGS. 1 through 13. The following is a list of defined components and/or aspects and reference numbers therefor, as used throughout the figures:

| Reference No. | Component |
| --- | --- |
| 100 | implementation environment |
| 101 | EOES system |
| 103 | employer user |
| 105 | communications connections |
| 107 | enterprise resource planning system ("ERP") |
| 109 | local desktop computer system |
| 111 | local networked computer systems |
| 113 | business premises |
| 115 | smartphone |
| 117 | tablet computer |
| 119 | field agents |
| 121 | field work location |
| 123 | computer system displays |
| 125 | employment applications |
| 127 | employment candidates |
| 129 | candidate information repository |
| 131 | AI sub-system |
| 133 | visual GUI tools |
| 135 | local desktop computer system display |
| 137 | response indicators |
| 200 | enterprise computer system |
| 201 | EOES system |
| 203 | human resources computer system |
| 205 | operations subsystem |
| 207 | research and development subsystem |
| 209 | accounting and finance subsystem |
| 211 | marketing subsystem |
| 213 | sales subsystem |
| 215 | C-suite subsystem |
| 217 | senior management subsystem |
| 219 | alternative business unit subsystem(s) |
| 221 | flagged communications repository |
| 223 | monitoring connections |
| 301 | EOES system |
| 303 | control system |
| 305 | operating system |
| 307 | AI modules |
| 309 | external resources |
| 311 | communications connections |
| 313 | hiring information filtration, redaction and representation component |
| 315 | lost employment opportunity and bias monitoring component |
| 317 | lost employment opportunity and bias reporting component |
| 319 | multi-channel business communications monitoring sub-system |
| 321 | legal and regulatory compliance guidance and insurance component |
| 323 | ratings engine |
| 325 | human resources reports |
| 327 | compliance reports |
| 329 | red flag indicators |
| 331 | active interventions |
| 333 | reprocessed documents |
| 335 | GoalZetter score output |
| 400 | control system |
| 401 | input/output device |
| 403 | memory device |
| 405 | long-term data storage device |
| 407 | processor(s) |
| 409 | Internet server(s) |
| 411 | local machine(s) |
| 413 | cameras and microphones |
| 414 | sensor(s) |
| 415 | ubiquitous computing devices |
| 417 | application programming interface |

| Reference No. | Component |
| --- | --- |
| 418 | scanner |
| 419 | tablet, computer and/or smartphone with application software |
| 501 | GUI |
| 503 | menu tool |
| 505 | display screen |
| 507 | GUI input arrow |
| 509 | identity indicator |
| 511 | time indicator |
| 513 | professional development indicator |
| 515 | explicit bias indicator |
| 517 | explicit bias details indicator |
| 519 | red flag indicator(s) |
| 521 | implicit bias indicator |
| 523 | implicit bias details indicator |
| 525 | red flag indicator(s) |
| 527 | division status section |
| 528 | [D]descriptor (of division) |
| 529 | hiring trend indicator |
| 531 | hiring trend indicator |
| 533 | hiring trend comparison indicator |
| 535 | promotion decision review and revision tool |
| 537 | promotion decision investigation tool |
| 539 | legal compliance GUI section |
| 541 | legal provision type indicator |
| 543 | selectable, expandable provision type tools |
| 545 | expandable textual indicator |
| 547 | protected class status indicator |
| 549 | compliance manual GUI section |
| 551 | legal provision type indicator |
| 553 | selectable, expandable provision type tools |
| 555 | expandable textual indicator |
| 601 | GUI |
| 603 | display screen |
| 605 | GUI input arrow |
| 607 | initial rationale request tool |
| 609 | significance indicators |
| 611 | primary reason indicator |
| 613 | uppermost data entry window |
| 615 | secondary reason indicator |
| 617 | data entry window |
| 619 | tertiary reason indicator |
| 621 | data entry window |
| 623 | countdown timer |
| 701 | GUI |
| 703 | display screen |
| 705 | GUI input arrow |
| 707 | GoalZetter score indicator |
| 709 | time relational period indicator |
| 711 | score goal indicator |
| 713 | shortfall indicator |
| 715 | statistical anomaly indicators |
| 717 | statistical anomaly indicator |
| 719 | statistical anomaly indicator |
| 721 | analysis section |
| 723 | analytical indicators |
| 725 | dynamically populated analytical sub-tools |
| 727 | implicitly biased communications indicator |
| 800 et seq. | example method steps |
| 901 | GUI |
| 903 | alert section |
| 905 | detailed information |
| 907 | dossier section |
| 909 | biased action indicator |
| 911 | logical statements |
| 913 | selectable additional action options |
| 1000 | employment application material |
| 1001 | name and headline section |
| 1003 | headshot section |
| 1005 | personal statement section |
| 1007 | education background section |
| 1009 | work history/experience section |
| 1011 | special skills section |
| 1013 | contact information section |
| 1015 | name |
| 1017 | university title |

-continued

| Reference No. | Component |
| --- | --- |
| 1019 | timeline sections |
| 1021 | reported address |
| 1023 | reported e-mail address |
| 1100 | GUI |
| 1101 | dark box |
| 1103 | school name redaction box |
| 1200 et seq. | example method steps |
| 1300 | implementation environment |
| 1301 | EOES system |
| 1303 | colloquy generating AI subsystem |
| 1305 | colloquy |
| 1307 | local computer system |
| 1309 | display |
| 1311 | avatar |
| 1313 | communication connections |
| 1315 | API calls |
| 1317 | information repository(ies) |
| 1319 | current employment situation map |
| 1321 | model generating component |
| 1323 | model example of position and employment status |
| 1325 | psychological chat subsystem |

FIG. 1 depicts an example implementation environment 100 for a unique new form of employment-related platform, referred to as an employment opportunity enhancement system (an "EOES system"), such as the example shown as EOES system 101, which may be used by an employer and/or human resources agent of an employer, such as example employer user 103, to improve the functioning of their business, in accordance with some embodiments of one or more of the invention(s) set forth in this application. As will be explained in greater detail below, in various embodiments of the present inventions, EOES system 101 aids in providing opportunities for employment and career advancement to current employees and/or other persons best suited for a position based on their qualifications, as will be explained in greater detail below.

In some embodiments, such an EOES system includes one or more control systems including specialized computer hardware and software, such as the example control system set forth below, in reference to FIG. 4. In some embodiments, the inventions set forth in this Application are implemented as a comprehensive, all-inclusive control system. And, in some embodiments, EOES system 101 is connected (e.g., via example communications connections 105) with one or more additional control systems, which may include or be included within, additional computer systems. For example, in some embodiments, EOES system 101 may be communicatively connected with an enterprise resource planning system ("ERP") 107, which may be included in one or more additional computer systems, and may manage operations of a business or business unit, in some embodiments. As another example, in some embodiments, EOES system 101 may be communicatively connected with one or more additional, local computer systems, such as example local desktop computer system 109, and example local networked computer systems 111, each of which may be located on business premises 113 owned by the business, and/or a business unit thereof. In some embodiments, EOES system 101 may be communicatively connected with a plurality of additional, local computer systems, which may be owned by a business, or agent or affiliate of the business. And, in some embodiments, the EOES system includes and/or is communicatively connected with, multiple periph- eral devices (such as example smartphone 115, and handheld tablet computer 117 held by field agents, such as example field agents 119, of the business) running one or more mobile application(s), in accordance with aspects of the inventions set forth herein, comprising or comprised in the control system of the EOES system (e.g., by additional communications connections, which may be wireless communications connections). In some embodiments, in addition to more traditional functions and uses of such local computer systems and peripheral devices in business settings, such local computer systems and peripheral devices may monitor a wide variety of communications and activities carried out by employees and agents, both on business premises 113 and away from the business's premises and/or buildings, for example, in field work location 121. And, in accordance with various embodiments, computer hardware and software components of the EOES system create API calls, queries or other requests for specific data related to such communications and activities. In addition, in some such embodiments, additional computer hardware and software components, which may be partially resident within such local computer systems and peripheral devices both on the business premises and in the field, as discussed above, may also create data and export data packets to the control system of the EOES system, for example, using one or more of communications connections 105. In some embodiments, such data packets may be specifically created and designated based on API calls, queries and/or other requests or commands from the control system of the EOES system.

In addition, in some embodiments, the EOES system generates unique graphical user interface(s) ("GUIs") on output devices of any of the above discussed local computer systems and peripheral devices, such as the example display screens shown as computer system displays 123 to issue statements, engage in colloquy with users, and generate red flags and other initiatives and functions, as will be discussed in greater detail below, for example, in FIG. 2.

In addition, all of such control systems, peripheral device(s) and/or an EOES system 101 may communicate with additional, unrelated systems, such as an external, off-premises aspect of the EOES system and/or an ERP (such as example ERP 107), in various embodiments. As another example, in some embodiments, private computer systems of individuals may generate hiring and other employment-related data, such as example employment applications 125 from local computer system submissions (e.g., via e-mail or an application portal) from individual employment candidates, such as example employment candidates 127, and storing that information in a candidate information repository 129, accessible by the EOES system 101 for storing and reading information, in some embodiments. In some embodiments, a control system comprising or comprised in the EOES system 101, includes specialized computer hardware and software, configured to aid in monitoring and managing employment related decisions and actions, employee and managerial performance, and employee development and inclusion within a business.

Generally speaking, and as will be discussed in greater detail below, in some embodiments, EOES systems in accordance with the present application include one or more artificial intelligence ("AI") sub-systems and/or modules, such as example AI sub-system 131. In some embodiments, such AI subsystems and/or modules include specialized computer hardware and software which apply one or more algorithm(s) assessing whether, and the degree to which, employment opportunities are available and being accessed by employees, based on business communications, documentation and other evidence produced during the operation of the business. In some embodiments, such an AI subsystem includes a neural network, implementing a large language model ("LLM"), which may be trained on data related to prior business communications, documentation and other evidence associated with different employment-related activities associated with successful and unsuccessful employment outcomes. In some such embodiments, such a successful employment outcome includes hiring activity, or a hiring pattern, demonstrating transparency, fair access to employment opportunities, and improved earnings and operational effectiveness. In some embodiments, users of the EOES system may aid in such training by labelling past recorded business communications, documentation and other evidence as including red flags or resulting in inequitable employment actions, among other approaches to LLM training. And, in some embodiments, such an EOES system itself generates specialized communications, documentation and other evidence, with the aid of such an LLM.

Generally speaking, such an EOES system may include multiple, mutually-synergistic components, which may include: 1) a hiring information filtration, redaction and representation component; 2) a lost employment opportunity and bias monitoring component; 3) an employee coaching and guidance component including a chat aspect; 4) a multi-channel business communications monitoring subsystem; 5) a legal and regulatory compliance guidance and insurance component; and 6) a ratings engine, for generating one or more rating(s) quantifying a business' successful cultivation of opportunity, fairness and productivity in a workplace. The unique, useful functions of each of the above components will be discussed in further detail, below. And, in various embodiments, each of the above components includes one or more AI subsystem and/or special graphical user interface tools, sub-tools and other useful new structures and devices for carrying out their functions.

Returning to example local desktop computer system 107, and, for example, component number 3, discussed above, in some embodiments, such an AI subsystem implements interviewing techniques by generating questions, calls to action and statements, and posing them to users via dynamic script generation and a text-to-speech subsystem, and by analyzing candidate's responses and other verbal interactions by a speech-to-text subsystem and text analysis subsystem. In some embodiments, a chat-bot, or other colloquy generating AI sub-system is included in the EOES System, and presents such questions, calls to action and statements to a user, for example, within visual GUI tools 133 on local desktop computer system display 135. And, in some such embodiments, the colloquy generating AI sub-system includes an algorithm creating one or more inquiries, including such questions, calls to action and statements, put to employers and employees, to aid in identifying the presence of unfair bias and opaqueness in employment opportunity based on past equal opportunity indicating language and sentiment analysis. And, in some such embodiments, the algorithm may be determined and modified by an LLM based on training and experience, which may determine the identity and weighting of relevant variables for such an algorithm. In some embodiments, the user subject to the colloquy with the chat-bot may then provide responses, such as by selecting one or more example response indicators 137. And, in some embodiments, the chat-bot provides additional questions, calls to action and statements to the user which are created in real time, based on the responses provided by the user.

In some embodiments, such an EOES system aids in establishing an employment practice known as "right-placing," meaning that the most suitable candidates for a position, apart from any irrelevant demographic considerations, are being successfully placed in that position. And, in some embodiments, such an EOES system aids in establishing an employment practice known as "specific cultivation," cultivating fulfilling growth opportunities for employees and employers alike, and cultivating the development of employees in ways that are increasingly specific to individual employee and employer needs.

Some aspects of the present application are related to assessing and improving businesses' awareness of their performance as employers, and their employees' performance and satisfaction. For example, as mentioned above, in some embodiments, the EOES system generates KPIs and/or ratings, which may be shared with human resources personnel and management executives, and some KPIs and ratings so generated may relate to employee performance and satisfaction metrics and other analysis.

As another example, in some embodiments, the EOES system generates alerts and interventions when an aspect of the EOES system, such as an AI sub-system, identifies red flags and inequitable employment actions in business communications, documentation and other evidence. Thus, for example, in some embodiments, the EOES system generates a red flag if language used by one or more of field agents 119, while using example smartphone 115 or handheld tablet computer 117 to communicate with other employees or the public indicates impermissible bias.

In some embodiments, one or more scores may be generated, based on, among other factors: a) the degree to which a business has attained or exceeded its performance goals with respect to providing equal employment opportunities; b) whether the business has achieved employee demographics representative of a pool of employee candidates, or in a larger population; c) the legal compliance of the business with employment and human resource laws and regulations; and/or d) increased revenue and opportunity associated with "right-placing," meaning that the most suitable candidates for a position, apart from any irrelevant demographic considerations, are being successfully placed in that position. Such a score may be referred to as a "GoalZetter score," in some embodiments.

Figure 2:
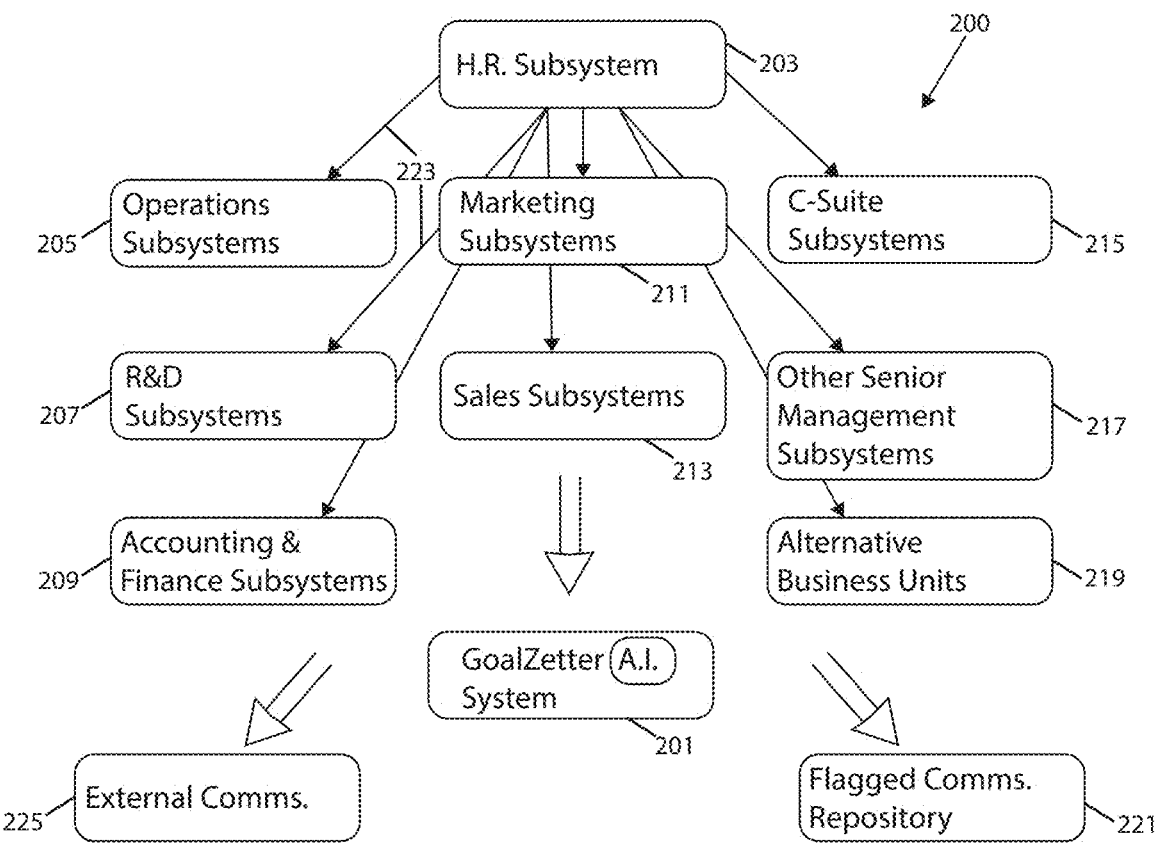
FIG. 2 is a diagram of an example implementation of an EOES system within an enterprise computer system, in accordance with some embodiments.

FIG. 2 is a diagram of an example implementation of an EOES system 201, which may be similar in nature to any of the other EOES systems discussed in this application, within an enterprise computer system 200, in accordance with some embodiments. As with other example EOES systems and implementations set forth in the present application, in some embodiments, EOES system 201 may comprise, or be comprised within, a control system including computer hardware and software, such as the control system set forth in reference to FIG. 4, below, in some embodiments. Similarly, in some embodiments, EOES system 201 may also comprise, or be comprised in, such a control system, which may be the same control system in some embodiments. And, as explained above in reference to FIG. 1, in some embodiments, EOES system 201 may be integrated into a larger business computer system (of a business such as any of the example business discussed in this application), and, in the example provided in the present figure, such a business computer system may be implemented across a wide variety of business units of the business, networked computer systems and subsystems and software instances, as an enterprise computer system, in some embodiments.

For example, such a business may maintain dedicated computer systems and subsystems thereof for all major functions of the business, within enterprise computer system 200. For example, some businesses may have one or more such subsystem dedicated to a human resources department of the business, such as example human resources computer system 203. As another example, some businesses may have one or more such subsystem dedicated to an operations department of the business, such as example operations subsystem 205. As another example, some businesses may have one or more such subsystem dedicated to a research and development department of the business, such as example research and development subsystem 207. As another example, some businesses may have one or more such subsystem dedicated to an accounting and finance department of the business, such as example accounting and finance subsystem 209. As another example, some businesses may have one or more such subsystem dedicated to a marketing department of the business, such as example marketing subsystem 211. As another example, some businesses may have one or more such subsystem dedicated to a sales department of the business, such as example sales subsystem 213. As another example, some businesses may have one or more such subsystem dedicated to an executive suite of the business, such as example C-suite subsystem 215. As another example, some businesses may have one or more such subsystem dedicated to other senior management of the business, such as example senior management subsystem 217. And, as another example, some businesses may have one or more such subsystem dedicated to other, alternative business units, such as example alternative business unit subsystem(s) 219.

In any event, regardless of the number and variety of subsystems of enterprise computer system 200, as discussed above, in some embodiments, the EOES system 201 may be communicatively connected with, and monitor communications to and from, each and every one of the subsystems of the enterprise computer system, as discussed above. In addition, in monitoring such communications, the EOES system may also record the time, sender, recipient, and other information regarding the contents of such communications, such as whether the communications include "red flags" as defined in this application. In some such embodiments, the EOES system may record such information regarding the contents of such communications in a communications repository, including separate, dedicated files including metadata regarding such information and a faithful recording and/or transcript of each such communication. An example of such a communications recording is provided as flagged communications repository 221.

In some embodiments, EOES system 201 may be implemented within, or administered by, human resources computer system 203. In such implementations, the human resources computer system 203 may directly monitor such communications, as shown by communications monitoring connections, such as the examples shown as monitoring connections 223. However, in other embodiments, EOES system 201 may itself include monitoring connections such as example monitoring connections 223. In some embodiments, all communications by and between any such subsystems may be monitored by any such communications monitoring connections, such that more comprehensive business conduct and communications records can be maintained. In some embodiments, cameras, microphones, passive infrared sensors, employee locator tags and sensors, and/or sensors may be included within business units, which also form a part of the relevant subsystems, and recordings from such sensors are also monitored and/or recorded by the monitoring connection. In addition, in some embodiments, external communications, to and from the enterprise system 200 and external, networked systems, are monitored by such communications monitoring connections.

FIG. 3 is a diagram of example major system components and modules of an example EOES system 301, which may comprise, or be comprised within, a control system and/or computer hardware, such as the control system set forth in reference to FIG. 4, below, in accordance with some embodiments.

Generally speaking, EOES system 301 comprises an example implementation of techniques for aiding in the enhancement of opportunities, fairness and productivity for employees within a workplace. Embodiments of such an EOES system are capable of operating in a wide variety of business contexts, ranging from small, local businesses to companies in the most complex, highly-regulated industries.

Among other things, example EOES system 301 may comprise (or be comprised within), but is not limited to, any number of computer hardware devices programmed with example software or otherwise configured to carry out aspects of the present invention set forth in the present application-including, but not limited to the example control systems, networks and computer hardware and software set forth in this application. A number of example implementations of the present invention may be carried out within the framework of EOES system 301, some of which will be discussed in greater detail below.

In some embodiments, an EOES system includes a control system 303, which itself may comprise, or be comprised within, computer hardware (such as the computer hardware system 400, discussed below, and/or a local computer system and/or peripheral device). As also discussed elsewhere in this application, such computer hardware may comprise a number of input and output devices, and one or more GUIs, designed and created with computer software, configuring the computer hardware for a user to carry out any aspect of the present invention set forth in the present application, such as cultivating the availability of opportunities for career development and monitoring a variety of communications through the computer hardware system and/or control system, or any of the other steps set forth in the present application (for example, in FIGS. 8 and 12, below). Control system 303 may comprise an operating system 305, which manages control system 303 resources, and acts as an intermediary between the control system 303 and software and hardware modules, such as example artificial intelligence ("AI") modules 307, example embodiments of which are discussed in further detail below, and each of which may include a specialized large language learning module ("LLM") 308 in some embodiments. Such software and hardware modules thus may run on the control system 303, and may be managed by the operating system 305, and may, among other aspects discussed in this application, aid in managing employment listings, candidacy, applications, interviews, and hiring decisions, as discussed in detail throughout this application. In so doing, control system 303, operating system 305, and AI Modules 307 may also connect with external resources 309, in some embodiments (e.g., via example communications connections 311) which external resources may include a wide variety of external databases and additional control systems, which may themselves be similar in nature to the example control system set forth below, in reference to FIG. 4. Internal communications monitoring connections (not pictured) may also be included, among other things, allowing AI modules 307 to provide output to other aspects of EOES system 301, as discussed elsewhere in this application.

In some embodiments, EOES system 301 includes multiple, mutually-synergistic components, such as computer hardware and software modules, each comprising specialized computer hardware and software, which may include: 1) a hiring information filtration, redaction and representation component 313; 2) a lost employment opportunity and bias monitoring component 315; 3) an employee coaching and guidance component 317; 4) a multi-channel business communications monitoring sub-system 319; 5) a legal and regulatory compliance guidance and insurance component 321; and 6) a ratings engine 323, for generating one or more rating(s) quantifying a business' successful cultivation of opportunity, fairness and productivity in a workplace. The unique, useful functions of each of the above components will be discussed in further detail, below. And, in various embodiments, each of the above components includes special graphical user interface tools, sub-tools and other useful new structures and devices for carrying out their functions.

Generally speaking, the above components aid in monitoring and managing employment related decisions and actions, human resources and employee performance, and employee development, opportunity and inclusion within a business. In various embodiments of the present inventions, EOES system 301 aids in providing opportunities for employment and career advancement to current employees and/or other persons best suited for a position based on their qualifications, as will be explained in greater detail below. For example, in some embodiments, such an EOES system aids in establishing an employment practice known as "right-placing," meaning that the most suitable candidates for a position, apart from any irrelevant demographic considerations, are being successfully placed in that position. And, in some embodiments, such an EOES system aids in establishing an employment practice known as "specific cultivation," cultivating fulfilling growth opportunities for employees and employers alike, and cultivating the development of employees in ways that are increasingly specific to individual employee and employer needs.

As tools for so monitoring and managing employment related decisions and actions, employer and employee performance, and employee development, in some embodiments, EOES system 301 and control system 303 generate regular and/or ad hoc reports, such as example human resources reports 325 and example compliance reports 327. In some such embodiments, such reports may be generated in real time, based on a multi-channel business communications monitoring sub-system. And, in some embodiments, such reports may be triggered by, and include indicators of red flags, such as example red flag indicators 329 of compliance reports 327, based on detecting such red flags. And, in some embodiments, such reports may include KPIs and/or ratings, and may be shared with human resources personnel and management executives, and some KPIs and ratings so generated may relate to employee performance and satisfaction metrics and other analysis. As another example, in some embodiments, the EOES system generates alerts and active interventions, symbolized as example active interventions 331, when an aspect of the EOES system, such as an AI subsystem, identifies inequitable employment actions in business communications, documentation and other evidence. In some embodiments, hiring information filtration, redaction and representation component 313 may generate specialized output related to its function of reviewing and processing employment-related documentation, namely, a reprocessed version of such documents and/or information therein, such as example reprocessed documents 333, in some such embodiments.

And, as mentioned above, in some embodiments, one or more of the AI modules, such as ratings engine 323, generating one or more rating(s) quantifying a business' successful cultivation of opportunity, fairness and productivity in a workplace, such as example GoalZetter score output 335.

Figure 7:
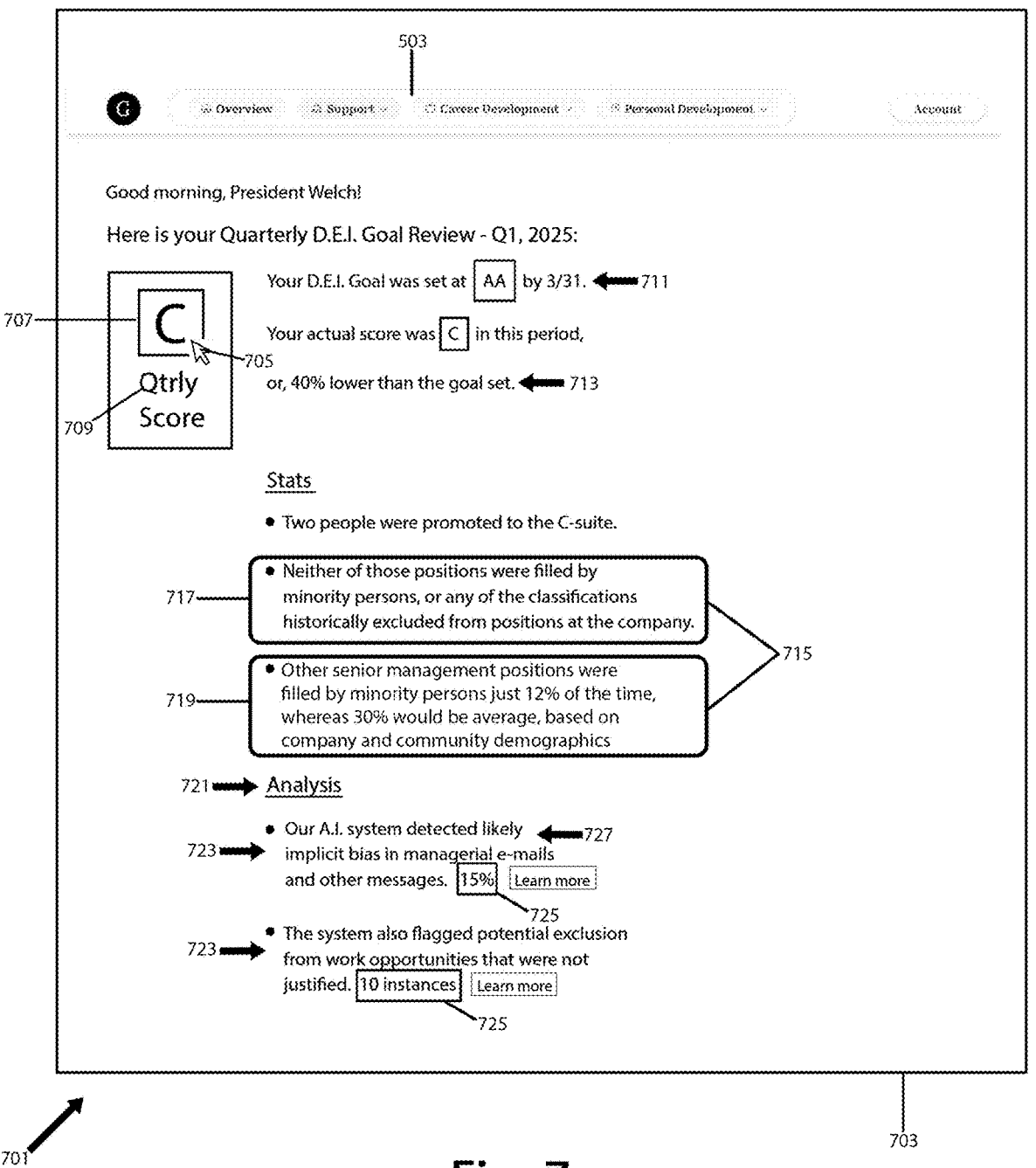
FIG. 7 depicts another example graphical user interface ("GUI") which may be included in an EOES system, to carry out additional aspects of the present inventions related to senior executive business management, in accordance with some embodiments.

Examples of such reports and ratings are provided elsewhere in this application, for example, in reference to FIGS. 5 and 7.

Figure 4:
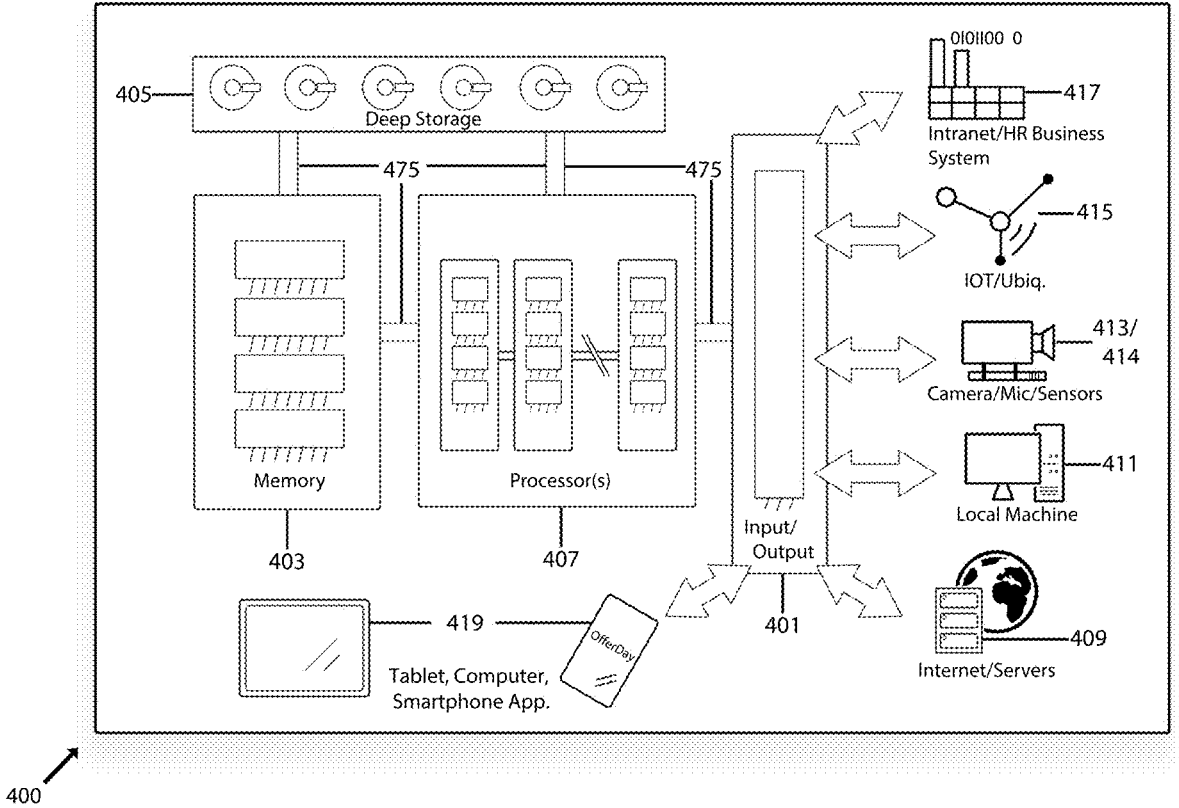
FIG. 4 is a schematic block diagram of some elements of a control system in accordance with some embodiments.

FIG. 4 is a schematic block diagram of some elements of a control system 400 in accordance with some example embodiments. In some such example embodiments, control system 400 incorporates a non-transitory machine-readable medium storing instructions, that, when executed by one or more processors, execute various aspects of the present invention described herein. The generic and other components and aspects described herein are not exhaustive of the many different systems and variations, including a number of possible hardware aspects that might be used, in accordance with the example embodiments of the invention. Rather, the control system 400 depicted is an example embodiment.

Control system 400 includes an input/output device 401, a memory device 403, long-term data storage device 405, and processor(s) 407. The processor(s) 407 is (are) capable of receiving, interpreting, processing and manipulating signals and executing instructions for further processing and for output, pre-output and/or storage in and outside of the system. The processor(s) 407 may be general or multipurpose, single- or multi-threaded, and may have a single core or several processor cores, including microprocessors. Among other things, the processor is capable of processing signals and instructions for the input/output device 401, to cause a user interface to be provided or modified for use by a user on hardware, such as, but not limited to, physical hand-operated controls (e.g., on a handheld or other portable device, such as tablet or smartphone 419 running specialized computer software to manage diverse forms and instances of communications related to projects) and/or a personal computer monitor or terminal monitor with a mouse and keyboard and presentation and input-facilitating software (as in a graphical user interface, a.k.a. a "GUI") (e.g., on local machine(s) 411).

For example, user interface aspects, such as graphical "windows," "buttons" and data entry fields, may present via, for example, a display, one or more selectable option(s). When such an option is selected, such selection causes aspects of the control system to command other aspects of the control system to issue statements, engage in a colloquy with users, generate reports, create red flags and/or to take other particular steps to aid in providing opportunities for employment and career advancement to current employees and/or other persons best suited for a position based on their qualifications, in accordance with any and all techniques discussed in this application. As an example, in some embodiments, such as those discussed in greater detail below with respect to FIG. 5, the control system presents such options within a GUI including a variety of dynamically created indicators, educational text, and selectable or otherwise actuatable GUI sub-tools. However, in some embodiments, the control system will operate autonomously, even when user input by a GUI is not presently being provided. As an example, and also as explained elsewhere in this application, the control system may include a neural network, trained on data and/or documents labelled as being associated with historically biased employment outcomes, and creating unique algorithms for identifying evidence of discrimination prospectively, based on new business communications, and the control system may apply such an algorithm to generate red flags, reports and other actions, as discussed in detail elsewhere in this application based on such identified evidence of discrimination.

The processor(s) 407 may execute instructions stored in memory device 403 and/or long-term data storage device 405, and may communicate via system bus(ses) 475. Input/output device 401 is capable of input/output operations for the system, and may include and communicate through input and/or output hardware, and instances thereof, such as a computer mouse, scanning device or other sensors, actuator(s), communications antenna (ae), keyboard(s), smartphone(s) and/or PDA(s), networked or connected additional computer(s), camera(s) or microphone(s), a mixing board(s), real-to-real tape recorder(s), external hard disk recorder(s), additional movie and/or sound editing system(s) or gear, speaker(s), external filter(s), amp(s), preamp(s), equalizer(s), computer display screen(s) or touch screen(s). Such input/output hardware could implement a program or user interface created, in part, by software, permitting the system and user to carry out the user settings and input discussed in this application. Input/output device 401, memory device 403, data storage device 405, and processor(s) 407 are connected and able to send and receive communications, transmissions and instructions via system bus (ses) 475. Data storage device 405 is capable of providing mass storage for the system, and may be or incorporate a computer-readable medium, may be a connected mass storage device (e.g., flash drive or other drive connected to a Universal Serial Bus (USB) port or Wi-Fi), may use back-end (with or without middle-ware) or cloud storage over a network (e.g., the Internet) as either a memory backup for an internal mass storage device or as a primary memory storage means, or may simply be an internal mass storage device, such as a computer hard drive or optical drive. Generally speaking, the system may be implemented as a client/server arrangement, where features of the system are performed on a remote server, networked to the client and made a client and server by software on both the client computer and server computer. Also generally speaking, the system may be implemented as middleware, whereby it provides output and other services to an external system, including, but not limited to, any of the example devices and auxiliary devices and/or systems, shown as internet server(s) and blockchain(s) 409, local machine(s) 411, cameras and microphones 413, sensor(s) 414, internet of things or other ubiquitous computing devices 415, Intranet and/or business system 417, and tablet or smartphone 419. Similarly, the control system 400 is capable of accepting input from any of those auxiliary devices and systems, and modifying stored data within them and within itself, based on any input or output sent through input/output device 401.

Input and output devices may deliver their input and receive output by any known means, including, but not limited to, any of the hardware and/or software examples shown as internet server(s) and blockchain(s) 409, local machine(s) 411, cameras and microphones 413, sensor(s) 414, internet of things or other ubiquitous computing devices 415, Intranet and/or business system 417, and tablet or smartphone 419.

While the illustrated example of a control system 400 in accordance with the present invention may be helpful to understand the implementation of aspects of the invention, any suitable form of computer system known in the art may be used—for example, a simpler computer system containing just a processor for executing instructions from a memory or transmission source. The aspects or features set forth may be implemented with, and in any combination of, digital electronic circuitry, hardware, software, firmware, middleware or any other computing technology known in the art, any of which may be aided with external data from external hardware and software, optionally, by networked connection, such as by LAN, WAN or the many connections forming the Internet. The system can be embodied in a tangibly-stored computer program, as by a machine-readable medium and propagated signal, for execution by a programmable processor. The many possible method steps of the example embodiments presented herein may be performed by such a programmable processor, executing a program of instructions, operating on input and output, and generating output and stored data. A computer program includes instructions for a computer to carry out a particular activity to bring about a particular result, and may be written in any programming language, including compiled and uncompiled and interpreted languages and machine language, and can be deployed in any form, including a complete program, module, component, subroutine, or other suitable routine for a computer program.

FIG. 5 depicts an example graphical user interface ("GUI") 501 which may be included in an EOES system including, but not limited to, a control system having computer hardware and software, such as the example control system set forth in reference to FIG. 4, above, to carry out aspects of the present inventions related to human resources management, and, in particular, to cultivating employment and career development opportunities for individual job applicants and employees, in accordance with some embodiments. More specifically, GUI 501 may be a GUI dedicated to a business' agent responsible for hiring and performance reviews of employees, such as a human resources manager. In some embodiments, such an agent may be an administrative user of such an EOES system, having special privileges to view and edit information and manage hiring and employment actions for the business, and in some such embodiments, the control system may first prompt the administrative user with a secure user login and authentication challenge, and/or another form of authentication (e.g., 2-factor authentication), before presenting such a graphical user interface for use by such an administrative user. And, in some embodiments, the administrative user may navigate to and from GUI 501 via selectable navigation tools, such as selectable GUI menu tool 503, in some such embodiments.

In various embodiments, GUI 501 may be presented on a wide variety of displays, such as example display screen 505, of local computer and peripheral devices communicatively connected with and/or comprised in, a control system of the EOES system, which may be a control system such as that set forth above, in reference to FIG. 4, in some embodiments. In some such embodiments, such a control system may or may not be configured for communications with a communications network and/or additional, similar control systems. In any event, whether comprising or comprised within such a control system, display screen 503 may be capable of aiding in the enhancement of opportunities, fairness and productivity for employees within a workplace as part of an EOES system. In some embodiments, the local computer and peripheral devices may also include input devices (such as a computer keyboard and mouse), for manipulating an arrow pointer or cursor, such as example GUI input arrow 507).

As with other GUIs set forth in the present application, GUI 501 includes a number of tools and sub-tools, in some embodiments, and, in some such embodiments, also serves as an actionable report on an employment situation, such as the employment situation of an individual person hired by the business aided by the EOES system. For example, in some embodiments, GUI 501 includes dynamically-generated indicators. And, in some embodiments, some such dynamically-generated indicators are selectable and/or actuable by a user, as will be discussed further below.

Among other things, in some embodiments, such tools, sub-tools and indicators include the following. First, GUI 501 may include an identity indicator 509, which may indicate an identifier of an individual human person who is the subject of the report, which may include text displaying that person's name. Next, GUI 501 may include a position and time indicator 511, indicating, for example, as pictured, in a dynamically-generated textual phrase, the employee's current position, and the amount of time the employee has been in that position. Such a textual phrase, and other such textual phrases of other indicators, may be generated, in some embodiments, by an LLM—for example, by the LLM of AI modules 317, 319 and/or 321, discussed above, in some embodiments. GUI 501 may also include a professional development indicator 513 including various sub-indicators related to the career development of the person, including dynamically generated text related to the person's history of career development at the business, such as promotions. And, in some embodiments, such a history is compared to that of other employees, of a different demographic background than that person (e.g., male employees, when the person is known to be a female, in some embodiments). In some embodiments, GUI 501 includes an explicit bias indicator 515, indicating that explicit bias has been determined to be present in communications relating to the person recorded by the EOES system. And, in some embodiments, explicit bias indicator 515 may be accompanied by both an explicit bias details indicator 517 and one or more red flag indicator(s) 519, in some embodiments, which may be literally presented in a red color, in some embodiments. And, in some embodiments, GUI 501 includes an implicit bias indicator 521, indicating that implicit bias has been determined to be present in communications relating to the person recorded by the EOES system. And, in some embodiments, implicit bias indicator 521 may be accompanied by both an implicit bias details indicator 523 and one or more red flag indicator(s) 525, in some embodiments.

In some embodiments, GUI 501 includes a division status section 527, including and headed by a descriptor 528 of one or more division(s) in which the person is employed. Within division status section 527, one or more hiring trend indicators, such as example hiring trend indicator 529 and hiring trend indicator 531, may be included, in some embodiments, indicating whether hiring of one or more legally protected classes of persons, of which the person is a member, has been increasing or decreasing in recent time periods, and, if so, the amount that it has been increasing or decreasing. In addition, in some embodiments, GUI 501 includes a hiring trend comparison indicator 533, in some embodiments. In some such embodiments, hiring trend comparison indicator 533 includes a comparative conclusion (e.g., expressed in a generated text statement) of the hiring trends of the business in comparison to other, similar businesses. For example, in some embodiments, such businesses are considered similar where they are of a comparable market capitalization, geographic location, industry, sub-industry and/or employee headcount. And, in some embodiments, the comparative conclusion may relate to hiring trends of the other, similar businesses with respect to the hiring of one or more legally protected classes of persons, of which the person is a member. In some embodiments, such hiring trends may be differently, specially annotated, colored, or otherwise indicate if the hiring trend of the business with respect to the hiring of such legally protected class(es) of persons, of which the person is a member, is in an opposite direction to that at the other, similar businesses (e.g., in the color orange), than if the hiring trend of the business is in the same direction (e.g., in the color green)

Where explicit bias and/or implicit bias and/or red flags have been determined to exist for the given person subject to the report, in some embodiments, additional, actionable GUI tools may be provided. For example, in some embodiments, a promotion decision review and revision tool 535 is provided. In some such embodiments, by selecting promotion decision review and revision tool 535, the control system generates additional GUI aspects, enabling the administrative user to alter a past employment-related decision regarding the person, and to create additional records concerning the same. In some embodiments, the past employment-related decision regarding the person can only be altered positively through the EOES system, meaning that the person is provided with additional and/or greater employment opportunity with such altered decision. And, in some embodiments, the past employment-related decision regarding the person must be altered positively. Such alterations may be referred to as a form of "active intervention," meaning an action by the EOES system to redress an illegal, inappropriate or otherwise sub-optimal denial of employment opportunity to an individual (e.g., due to explicit bias or implicit bias). In addition, in some embodiments, a promotion decision investigation tool 537 is provided. In some such embodiments, by selecting promotion decision investigation tool 537, the control system generates additional GUI aspects, enabling the administrative user to send one or more active intervention(s) into the hiring process that resulted in the person being the subject of bias. For example, in some embodiments, upon selecting promotion decision investigation tool 537, the EOES system determines that one or more party(ies) were evincing bias, or, in some embodiments, were potentially witness to biased employment activities, whether implicit or explicit, and requires affirmative follow-up with and/or by that party(ies) to better determine whether such bias is in fact present. For example, in some embodiments, selecting such a promotion decision investigation tool will trigger a specialized investigative GUI to be presented to that party(ies). In some such embodiments, such a specialized investigative GUI may request, in a generated textual statement, what the reason for the bias was and/or if there was a reason not related to improper demographic considerations (e.g., the person being a member of a legally protected class of persons). An example of such a specialized investigative GUI is provided in FIG. 6.

In some embodiments, GUI 501 includes contextual educational GUI sections and tools, such as legal compliance GUI section 539, and legal provision type indicator 541, which indicate the nature of legal authority(ies) relevant to the bias determined to exist by the control system. In some embodiments, selectable, expandable provision type tools 543 are provided, which may enlarge their appearance and reveal additional information regarding the specific legal authority, including a citation for those legal authority(ies). In addition, in some embodiments, the legal compliance GUI section 539 includes expandable textual indicators, such as expandable textual indicator 545, indicating relevant legal language with respect to the exact type and instance of bias detected by the control system, when selected by the administrative user. Once expanded, e.g., by a user "clicking on" expandable textual indicator 545, in some embodiments, a selection of relevant text from the legal authority is presented. In some embodiments, the selection of relevant text includes a complete sentence expressing a combination of the substance of the legal provision and the exact language of the provision, which is substantively accurate, as determined by one or more of the LLMs.

In some embodiments, GUI 501 includes a protected class status indicator 547, which may include a complete explanation of the nature of the protected status of the person.

In some embodiments, GUI 501 includes a compliance manual GUI section 549, and legal provision type indicator 551, which indicate the nature of company policy provisions relevant to the bias determined to exist by the control system. In some embodiments, a selectable, expandable provision type tools 553 are provided, which may enlarge their appearance and reveal additional information regarding the specific policy provision, including a citation for those legal authority(ies). In addition, in some embodiments, compliance manual GUI section 549 includes expandable textual indicators, such as expandable textual indicator 555, indicating relevant legal language with respect to the exact type and instance of bias detected by the control system, when selected by the administrative user. Once expanded, e.g., by a user "clicking on" expandable textual indicator 555, in some embodiments, a selection of relevant text from the legal authority is presented. In some embodiments, the selection of relevant text includes a complete sentence expressing a combination of the substance of the legal provision and the exact language of the provision, which is substantively accurate, as determined by one or more of the LLMs.

Of course, any number of alternative GUI elements and hardware devices may, instead or in addition to those pictured, be used to carry out the display, input and other operations necessary or helpful for carrying out aspects of the invention set forth in this application. The exact detailed embodiments provided, including the devices and GUI elements set forth in the figures and discussed in detail in this application are, of course, exemplary, and not limiting. Rather, these embodiments are intended only as a reasonable set of possible exemplary structures, substructures, materials, methods, steps and other aspects of the present invention, among virtually infinite and innumerable possibilities for carrying out the present invention, to ease comprehension of the disclosure, as will be readily apparent to those of ordinary skill in the art. For example, the description of one particular order, number or other arrangement of any aspects of the present invention set forth herein is illustrative, not limiting, and all other possible orders, numbers, etc., are also within the scope of the invention, as will be so readily apparent. Any aspect of the invention set forth herein may be included with any other aspect in a particular embodiment, as well as any aspects known in the art, in any number, order, arrangement, or alternative configuration while still carrying out, and falling within, the scope of the invention.

Figure 6:
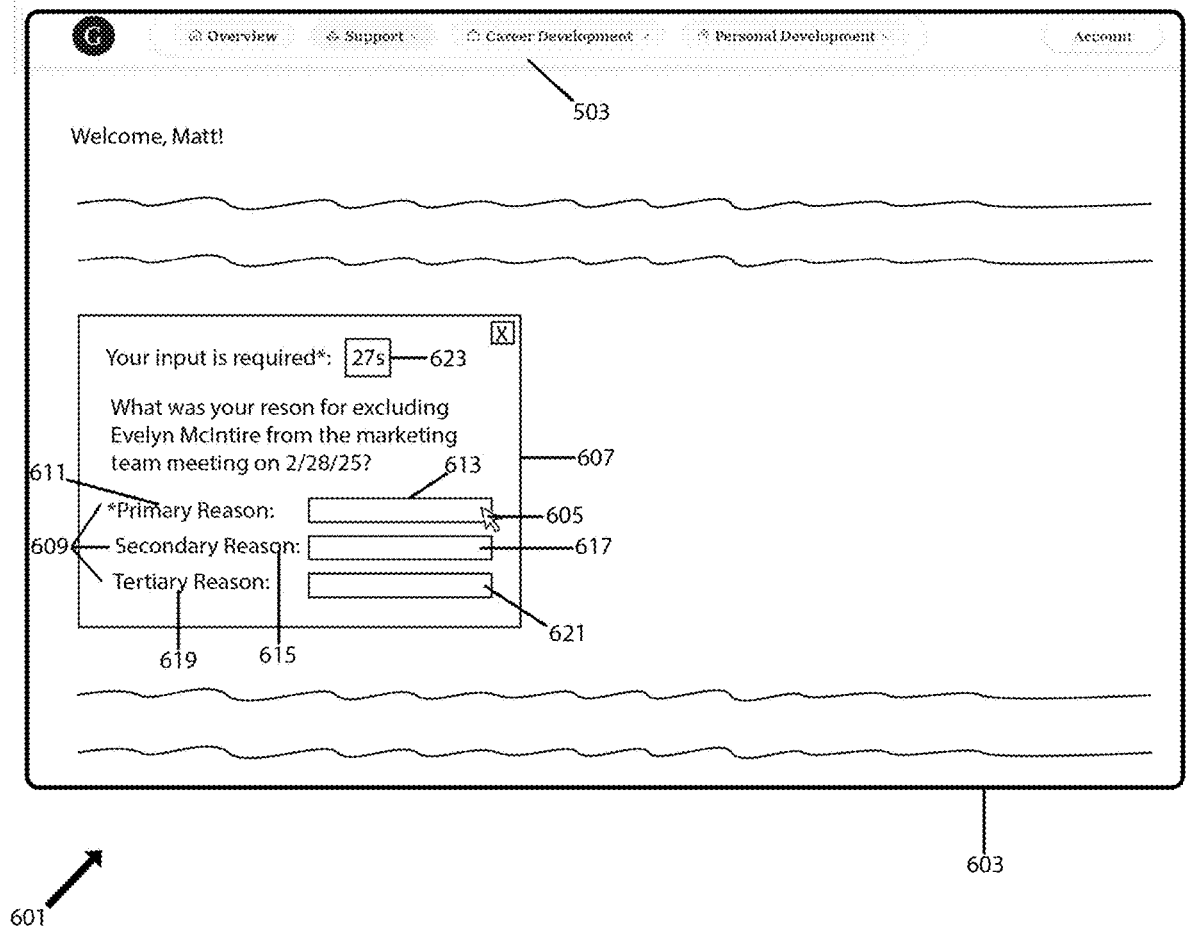
FIG. 6 depicts another example graphical user interface ("GUI") which may be included in an EOES system, to carry out additional aspects of the present inventions related to human resources management, in accordance with some embodiments.

FIG. 6 depicts another example graphical user interface ("GUI") 601 which may be included in an EOES system including, but not limited to, a control system having computer hardware and software, such as the example control system set forth in reference to FIG. 4, above, to carry out additional aspects of the present inventions related to human resources management, in accordance with some embodiments. More specifically, GUI 601 is a specialized GUI generated in response to an administrative user activating a promotion decision investigation tool, such as example promotion decision investigation tool 537, discussed above, in reference to FIG. 5. As discussed in FIG.

5, if EOES system determines one or more party(ies) evincing bias, or that were potentially witness to biased employment activities, whether implicit or explicit, the option to create GUI 601 is enabled, and may be selected. Generally speaking, GUI 601 requires affirmative follow-up by that party(ies), to better determine whether such bias is in fact present, and what further active interventions may be possible to abate and/or redress that bias.

In some embodiments, prior to requesting reasoning from the party(ies) and implementing the GUI tools discussed herein, the control system may first prompt the party(ies) with a secure user login and authentication challenge, and/or another form of authentication (e.g., 2-factor authentication), before presenting such a GUI for use by an administrative user. In some embodiments, prior to requesting reasoning from the party(ies) and implementing the GUI tools discussed herein, the control system may first prompt the party(ies) with a biometric challenge (e.g., a live picture of the party's (ies') face, which is then compared to data related to facial features of the party(ies) by the EOES system) and, such a GUI is so provided only if a match is indicated (e.g., over a pre-set confidence score). In some embodiments, a test for prevarication is performed as such a user is using such a GUI. For example, in some embodiments, the user's hesitation before providing reasons with the GUI, deletion of data, and biometrics (such as those monitored in a polygraph test) are sensed and recorded by the EOES system, and abnormal readings are recorded by the control system.

In some embodiments, the administrative user may navigate to and from GUI 601 and other GUIs via selectable navigation tools, such as selectable GUI menu tool 503, in some embodiments, as discussed above.

And, as with other GUIs set forth in the present application, GUI 601 may be presented on a wide variety of displays, such as example display screen 603, of local computer and peripheral devices communicatively connected with and/or comprised in, a control system, which may be a control system such as that set forth above, in reference to FIG. 4. In some such embodiments, such a control system may or may not be configured for communications with a communications network and/or other, similar control systems. In any event, whether comprising or comprised within such a control system, display screen 603 may be capable of aiding in the enhancement of opportunities, fairness and productivity for employees within a workplace as part of an EOES system. In some embodiments, the local computer and peripheral devices may also include input devices (such as a computer keyboard and mouse), for manipulating an arrow pointer or cursor, such as exemplary GUI input arrow 605). In some embodiments, GUI 601 includes dynamically-generated indicators. And, in some embodiments, some such dynamically-generated indicators are selectable by a user, as will be discussed further below.

Among other things, in some embodiments, such tools, sub-tools and indicators include the following. First, GUI 601 may include a variety of GUI tools, indicators, sub-tools and other aspects, to aid in eliciting and interpreting reasoning provided by the one or more party(ies) evincing bias, or that were potentially witness to biased employment activities.

For example, as pictured, in some such embodiments, GUI 601 may present a request to such party(ies) and may ask, in a generated textual statement, what the reason for the bias was and/or if there was a reason not related to improper demographic considerations (e.g., the person being a member of a legally protected class of persons). In some embodiments, the control system generates an initial version of GUI 601, which requests the reason(s) for the potentially biased decision being made, in initial rationale request tool 607. In some embodiments, GUI 601 includes one or more data entry windows, in which the party(ies) to state, in their own words, what the reason was for taking the potentially biased action. For example, in the version pictured, generated in a scenario where a female employee was excluded from a business meeting, and her position and profile would indicate that she should have been included, the initial rationale request tool 603 requests what the actual reason for excluding her was, in the party(ies) own words. In some embodiments, a plurality of data entry windows are provided, and, in some such embodiments, each such data entry window may indicate the relative importance of each rationale being provided in each such window, e.g., in significance indicators 609. For example, a primary reason indicator 611 is located in close relation to uppermost data entry window 613. Similarly, a secondary reason indicator 615 is located in close relation to data entry window 617. Finally, a tertiary reason indicator 619 is shown located in close relation to data entry window 621.

In some embodiments, the control system presents GUI 601 and/or initial rationale request tool 607 for a limited time and, in some such embodiments, may actively indicate that limited time to the party(ies). In some embodiments, GUI 601 and/or initial rationale request tool 603 includes a countdown timer 623, visible to the party(ies) showing the remaining time, in real time, that the party(ies) has remaining to answer the question posed by the initial rationale request tool 603.

In some embodiments, each of the party(ies) stated reason(s) is/are analyzed by an LLM and/or other AI element of the control system to determine whether it is free of reasons evincing bias and invidious discrimination. For example, in some embodiments, answers containing words and phrases known to evince, or correlated with, bias are detected and tagged as potentially indicating bias. In some embodiments, draft answers, which are erased by the party(ies) and subject to revision, are logged and/or recorded, either or both as indicators of potential prevarication and for analysis as to whether the draft answers evince bias. And, in some embodiments, verifying or contradicting evidence with respect to those draft answers and/or reasons, if available on any data storage device of the EOES system, is gathered, recorded and logged. And, in some embodiments, follow-up questions are generated by an LLM of the EOES system, and further data entry windows are presented, based on responses potentially indicating such bias or invidious discrimination. For example, if the party(ies) indicated that the female employee was excluded from the meeting due to perceived scheduling burdens or conflicts, a follow up question may be posed by the control system to inquire whether the female employee's status as a mother, with children in school, was the reason for the perceived scheduling conflict, which could be a form of implicit bias known as benevolence bias.

If no bias or invidious discrimination is indicated, the employment related actions that led to the generation of GUI 601 may be sustained by the control system. However, if one of the stated reasons evinces bias and/or invidious discrimination, the control system may make active interventions to automatically freeze or reverse the employment related action, e.g., through computer-generated communications sent to local computer systems or peripheral devices owned by the person(s) affected by that bias and/or invidious discrimination, stating that the employment action has been so frozen or reversed, pending further review. In some embodiments, an administrative user may be prompted to take such active interventions. And, in some embodiments, remedial or other training may be mandated and delivered via the control system for employees whose communications and/or actions indicate actual bias, potential bias, and/or adverse exposure to such bias.

FIG. 7 depicts another example graphical user interface ("GUI") 701 which may be included in an EOES system, to carry out additional aspects of the present inventions related to senior executive business management, in accordance with some embodiments. As discussed elsewhere in this application, in some embodiments, one or more scores may be generated, e.g., by a ratings engine, which will be discussed below, based on, among other factors: a) the degree to which a business has attained or exceeded its performance goals with respect to providing equal employment opportunities; b) whether the business has achieved employee demographics representative of a pool of employee candidates, or in a larger population; c) the legal compliance of the business with employment and human resource laws and regulations; and/or d) increased revenue and opportunity associated with "right-placing," meaning that the most suitable candidates for a position, apart from any irrelevant demographic considerations, are being successfully placed in that position. Such a score may be referred to as a "GoalZetter score," in some embodiments. In some embodiments, such scores may be presented to particular agents of the business responsible for management of the business, in a GUI such as GUI 701.

In some embodiments, prior to requesting reasoning from the senior executive business management agent (such as a Chief Executive Officer or other executive) and implementing the GUI tools discussed herein, the control system may first prompt the executive with a secure user login and authentication challenge, and/or another form of authentication (e.g., 2-factor authentication), before presenting such a graphical user interface for use by an administrative user. And, in some embodiments, the administrative user may navigate to and from GUI 701 and other GUIs via selectable navigation tools, such as selectable GUI menu tool 503, in some embodiments, as discussed above.

And, as with other GUIs set forth in the present application, GUI 701 may be presented on a wide variety of displays, such as example display screen 703, of local computer and peripheral devices communicatively connected with and/or comprised in, a control system, which may be a control system such as that set forth above, in reference to FIG. 4. In some such embodiments, such a control system may or may not be configured for communications with a communications network and/or other, similar control systems. In any event, whether comprising or comprised within such a control system, display screen 703 may be capable of aiding in the enhancement of opportunities, fairness and productivity for employees within a workplace as part of an EOES system. In some embodiments, the local computer and peripheral devices may also include input devices (such as a computer keyboard and mouse), for manipulating an arrow pointer or cursor, such as exemplary GUI input arrow 705). In some embodiments, GUI 701 includes dynamically-generated indicators. And, in some embodiments, some such dynamically-generated indicators are selectable by a user, as will be discussed further below.

Among other things, in some embodiments, such tools, sub-tools and indicators include the following. First, GUI 701 may include a variety of GUI tools, sub-tools and indicators aiding business executives in understanding and managing the performance of the business in cultivating employee opportunity, fairness and productivity in a workplace.

For example, in the present figure, GUI 701 includes and presents a GoalZetter score, such as example alphanumeric GoalZetter score indicator 707, for the business, which reflects and quantifies the business' overall performance in cultivating employee opportunity, fairness and productivity in a workplace. GoalZetter score indicator 707 may be considered one form of key performance indicator ("KPI") for the business. In some embodiments, a GoalZetter score indicator may also include, or be presented along with, a relational time period indicator, such as example time relational period indicator 709, which indicates a time period to which the GoalZetter score relates, in some embodiments— for example, the previous business quarter, as pictured. In some embodiments, GUI 701 also includes and presents a score goal indicator 711, which may include a GoalZetter score sought to be achieved by the executive, and or the business. In some embodiments, the score sought may have been requested in another GUI aspect (not pictured). Both the GoalZetter score indicator 707 and the score goal indicator 711 may be indicated as part of a scale, ranging from a lowest to the highest possible quantification of the business' performance in cultivating employee opportunity, fairness and productivity in a workplace, as determined by a ratings engine aspect of the EOES system, which may include one or more AI subcomponents (such as an LLM), in some embodiments. For example, in some embodiments, a score of "A" may indicate that the algorithm has determined that the business has exceeded the highest of a series of thresholds (e.g., a level of unbiased communications and actions associated with the 90th percentile for unbiased business communications and employment actions) created by an algorithm generated and maintained by such an LLM, which has been trained on communications and outcomes labelled as positive or negative for performance in cultivating employee opportunity, fairness and productivity in a workplace. Thus, to extend the example, score goal indicator 711 indicates a goal set by the business of "AA." In some embodiments, such a score may indicate such a 90th percentile score. However, in some embodiments, the second "A" of the "AA" designation may relate to another specific aspect of the business related to whether or not the business is taking effective steps to actively improve farness in an industry, and/or to enhance the business's involvement with an external community, in some embodiments.

In the example pictured, the GoalZetter score indicator 707 actually indicates a score of "CC," which, in some embodiments, may indicate a 70th percentile score for unbiased business communications and employment actions, as determined by the same algorithm and ratings engine. Thus, the business has fallen far short of its predetermined goal, as illustrated by GUI 701, and can be considered a negative KPI. In some embodiments, a shortfall indicator 713 may be provided, revealing that fact.

In addition, GUI 701 is shown as depicting a number of additional indicators, including one or more statistical anomaly indicators 715, which may highlight statistical anomalies identified by an AI and/or LLM aspect of the EOES system in the context of a business seeking to cultivate employee opportunity, fairness and productivity in a workplace. For example, statistical anomaly indicator 717 indicates both historically excluded classes of persons at the business for a senior position (e.g., C-suite positions) and that none in those classes of persons were advanced in recent hiring decisions. And, as another example, statistical anomaly indicator 719 indicates a percentage of particular class(es) of persons at the business represented at all related positions (e.g., senior management positions) to the positions indicated to be filled by statistical anomaly indicator 715, and that a different level would be expected, based on demographic representation of that class(es) of persons. In some embodiments, GUI 701 includes an analysis section 721, which may include other analytical indicators 723 generated by such an AI component and/or LLM of the EOES system. In some embodiments, analytical indicators 723 may include dynamic numerical data, in dynamically populated analytical sub-tools 725. In some embodiments, one or more of such analytical sub-tools, such as implicitly biased communications indicator 727, may also include a business communications summary and identifier tool, which, when selected by the user, will produce an additional GUI setting forth passages from the relevant business communications leading to a conclusion that implicitly biased communications exist (not pictured).

In some embodiments, a ratings engine component, or part thereof, of an EOES system generates a target KPI related to demographics at the business, which may be included within GUI 701. In some such embodiments, such a ratings engine component or part thereof includes a demographics engine, including separate group identity status assessment data and indicators repositories. In some such embodiments, such repositories each include separate, dedicated and encrypted files including data gathered by the EOES system related to data and indicators for a separate employee and other personnel of the business. In some embodiments, such separate, dedicated and encrypted files include linguistic data and indicators of group identity status, based on communications to and from, and otherwise related to, a given employee or other person, which correlates with a particular group status. For example, some language and language forms, such as discussed topics or vernacular and slang, are more commonly used among members of an ethnic minority or other group that has historically been the subject of discrimination. In any event, an AI subsystem of the EOES system may then assign a presumptive group status identity to such an employee or other person, based on those linguistic data and indicators of group identity status (e.g., identifying the person as "African American," or "female," where their language usage is close to that of [e] Ebonics, or the interests discussed by that person are more common among women) in addition to formal designations of group identity status based, for example, on surveying such persons. In some such embodiments, the AI subsystem may include a large language learning module ("LLM"), which may compare such language used in connection with the person to patterns of language used by persons labelled as belonging to such groups, historically, and identify the person as belonging to such a group based on the degree of correlation in language usage or probability that the person is a member of that group exceeding a particular threshold (e.g., 50% correlation or 80% probability). The demographics engine may then, by comparing the population within the business, work histories, promotions, inclusion and other treatment of such persons belonging to such groups, with those of other groups not subject to historic discrimination, both inside the business and at other, similar businesses, to determine one or more demographics related to diversity, equity and inclusion for the business. And, in some such embodiments, the EOES system includes a demographics target KPI indicator generator, which may include specialized hardware and software which calculates and/or determine a KPI target based, at least in part, on such demographics. For example, in some embodiments, such a KPI indicator generator may determine that such demographics related to other groups not subject to historic discrimination, both inside the business and at other, similar businesses, are a target KPI for the business (e.g., such a generator including and performing statistics based on a database generating actual and potential groups with which each employee and other person related to the business is associated). However, in some embodiments, the business itself, or a third party, may designate such a target KPI, at least in part (e.g., based on the KPI generated by the demographics target KPI indicator generator). In some such embodiments, such a ratings engine, demographics target KPI indicator generator and target KPI relate to decision-making and opportunities provided to employees or other persons related to the business who are members of such groups historically subjected to discrimination, as compared to decision-making affecting and opportunities provided to other persons. In some such embodiments, the EOES system and/or includes a human resources demographics decision register, which includes a matrix of records and indicators of such decisions affecting and opportunities provided to such other persons. In some embodiments, the ratings engine includes a comparison software module including a correlation generator, configured to compare resulting demographics from a hiring decision to a demographics target KPI generated by said demographics target key performance indicator (KPI) generator. And, depending on whether the comparison software module indicates such a correlation within particular pre-selected thresholds (e.g., 15, 20, 30 or 50%) a different score may be generated by the comparison software module (e.g., A, AA, B and BB, respectively) and reported to one or more executives of the business, as will be discussed in greater detail below. In some embodiments, the comparison software module generates a positive, or more positive, score based on whether demographics related to the business exceed the target KPI. And, in some embodiments, the comparison software module generates a positive score based on whether the resulting demographics from a hiring decision exceed the target KPI.

Figure 8:
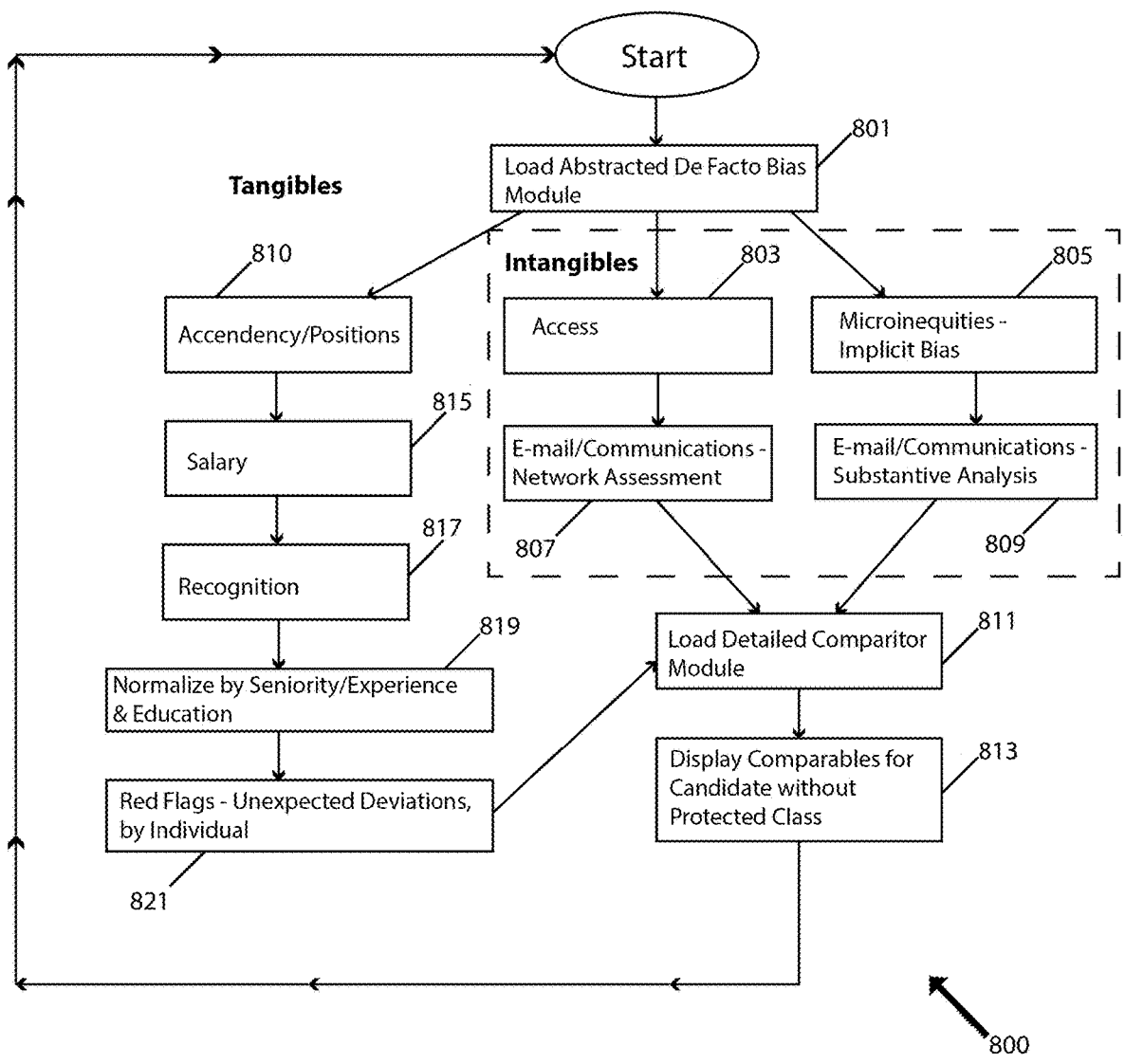
FIG. 8 is an example process flow diagram, illustrating some example steps that may be undertaken by a control system, such as the example control system provided in reference to FIG. 4, below, including and/or included within an OfferDay system, in accordance with some embodiments.

FIG. 8 is an example process flow diagram, illustrating some example steps 800 that may be undertaken by a control system, such as the example control system provided in reference to FIG. 4, above, including and/or included within an EOES system, in accordance with some embodiments.

Beginning with step 801, in some embodiments, the control system may begin by loading one or more computer hardware and software module that aid the EOES system in identifying de facto bias being exercised against employees or agents within a business or organization (meaning actual bias in practice in a business or other organization, but not bias that is dictated by a rule or policy of the business or organization) in which the EOES system has been installed. In some embodiments, such a de facto bias computer hardware and software module may include one or more AI sub-components, such as a neural network and/or LLM, such as any of the embodiments of neural networks and LLMs set forth in this application for aiding in the detection of bias. And, in some embodiments, such an AI sub-component is abstracted, in the sense that it operates to identify language and actions that are potentially biased, and deliver data concerning those conclusions, but does not produce all related data, or an exhaustive log regarding the underpinnings of its conclusions, at least to all users. In some embodiments, such a de facto bias computer hardware and software module may include multiple subroutines, each of which aid the EOES system and business or other organization in identifying a different form of de facto bias. For example, as pictured, in some embodiments, such a subroutine, which will be called a "tangible bias subroutine," is specialized for detecting and reporting the potential presence of bias in decision making and opportunities that are tangible for employees and agents of the organization or business (e.g., bias in the provision of promotions, salary, benefits and professional development courses), as shown on the left-hand side of the figure, while another such subroutine, which will be called an "intangible bias subroutine," is specialized for detecting and reporting the potential presence of bias in the treatment of employees and agents that is intangible (e.g., acts of kindness or microinequities which, although harder to prove and quantify, are also very destructive) as shown on the right-hand side of the figure.

In some embodiments, such multiple subroutines may be exercised concurrently with one another, by parallel processing. Beginning in this description with the intangible bias subroutine, the control system may proceed to step 803, in some embodiments, in which it performs an assessment of the type and degree of access to areas and groups of individuals (such as other employees, agents and clients) involved in the business or organization. In some embodiments, the type and degree of access is assessed by the control system based on invitations to events or meetings, which demonstrate the number and substantiality of the employee or agent's inclusion in business settings. And, in some embodiments, a relative score, comparing the employee or agent's level of access (e.g., based on the frequency and importance of meetings to which they are invited, and time spent at such meetings) with those of other employees and/or agents, may be assigned to the employee or agent. And, in some embodiments, the control system assigns an overall access score to the business and/or organization, based at least in part on a comparison of the access scores of employees and agents of the business belonging to groups that have historically been the subject of discrimination, to access scores of all employees and agents at other businesses having similar demographics or other characteristics to the business and/or organization, in steps 811 and 813, in some embodiments.

Next, the control system may proceed to step 805, in which it determines whether there is evidence supporting a conclusion that one or more microinequities have taken place against the employee and/or agent, using camera, sensor and audio-visual data, communications records, and other data gathered by a component or subcomponent of the EOES system. For example, in some embodiments, such data tending to indicate that the employee and/or agent has been subjected to negative facial expressions may be logged and, if objective evidence of poor performance by that employee shortly before the negative facial expressions has not been indicated, the control system may determine that a microinequity has taken place against that employee and/or agent. And, in some embodiments, the control system logs a plurality of records, for each such microinequity against the employee and/or agent, and compares the frequency, amount and degree of the microinequities against that employee and/or agent with similar logs created for other employees and/or agents. And, in some such embodiments, the comparison is adjusted per unit of time to create a relative microinequity score for that employee and/or agent. And, in some embodiments, the control system assigns a microinequity score to the entire business and/or organization, which may be based on a comparison to the number, frequency and severity of microinequities occurring at the business and/or organization overall (e.g., in comparison to other, demographically and otherwise similar businesses), in steps 811 and 813, in some embodiments.

Next, the control system may proceed to step 807, in some embodiments, in which it performs an assessment the communications/network strength of individuals (such as other employees, agents and clients) involved in the business or organization. In some embodiments, the network strength of such individuals is assessed by the control system based on network maps, which demonstrate the number and substantiality of the employee or agent's contacts with other employees and/or agents. For example, in some embodiments, the employee or agent's e-mail correspondence, text messages and/or telephone calls with such other employees and/or agents are tracked and used to construct such a network map. And, in some embodiments, a relative score, comparing the employee or agent's network map size and the strength of connections (e.g., based on repetition in correspondence or calls, and time spent conversing) with those of other employees and/or agents, may be assigned to the employee or agent. And, in some embodiments, the control system assigns an overall access score to the business and/or organization, based at least in part on a comparison of the network map size and strength of all employees and agents of the business belonging to groups that have historically been the subject of discrimination, to the network map size and strength of all employees and agents at other businesses having similar demographics or other characteristics to the business and/or organization, in steps 811 and 813, in some embodiments.

In some embodiments, the control system also may proceed to step 809, in some embodiments, in which it performs an assessment the substance of communications to such individuals involved in the business or organization. In some embodiments, the communications to such individuals is assessed by the control system based on an LLM, and its determination of whether biased language and unequal treatment is taking place in comparison to similarly situated agents and/or employees not belonging to a group that has been historically discriminated against. For example, in some embodiments, the employee or agent's e-mail correspondence, text messages and/or telephone calls with such other employees and/or agents are recorded and/or transcribed and a bias-detecting algorithm is applied, which, in some embodiments, determines whether biased language is being applied (either by keyword analysis and/or an LLM trained on language used by others found to have exercised unfair discrimination in the past. And, in some embodiments, a relative score, comparing the employee or agent's experience of substantive discrimination in communications in frequency and degree (e.g., based on repetition of biased language in correspondence or calls, and time spent enduring discrimination) with those of other employees and/or agents, may be assigned to the employee or agent. And, in some embodiments, the control system assigns an overall substantive communications discrimination score to the business and/or organization, based at least in part on a comparison of the frequency and degree of substantive discrimination in communications of all employees and agents of the business belonging to groups that have historically been the subject of discrimination, to that of all employees and agents at other businesses having similar demographics or other characteristics to the business and/or organization, in steps 811 and 813, in some embodiments.

The control system may then return to the starting position, in some embodiments.

As discussed above, in some embodiments, the control system also engages in a tangible bias subroutine, as shown on the left-hand side of the figure. Beginning with step 810, in some embodiments, the control system first assesses such an individual agent and/or employee's ascendancy at the business and/or organization, for example, based on the history of promotions and other increases in responsibility and trust (such as instances of being placed in closer contact with clients of the business and/or organization, in some embodiments) for the agent and/or employee. For example, in some embodiments, the control system includes a human resources subsystem, including records of such promotions and other increases in responsibility and trust, and other related data gathered by other components and/or subcomponents of the EOES system. And, in some embodiments, the control system maintains a plurality of records, for each such promotion and/or change in responsibility and/or trust related to employee and/or agent, and compares it to similar logs created for other employees and/or agents. And, in some such embodiments, the comparison is adjusted per unit of time to create a relative ascendancy score for that employee and/or agent. And, in some embodiments, the control system assigns an ascendancy score to the entire business and/or organization, which may be based on a comparison to the number, frequency and severity of promotions and increases in responsibility and trust occurring at the business and/or organization for groups that have experienced discrimination historically (e.g., in comparison to other, demographically and otherwise similar businesses), in steps 819, 821, 811 and 813, in some embodiments.

Next, in steps 815 and 817, in some embodiments, the control system assesses such an individual agent and/or employee's salary history and history of special recognition at the business and/or organization, for example, based on the history of increases in base salary, bonuses, commissions (if applicable), perks, and awards for the agent and/or employee. For example, in some embodiments, the control system includes a human resources subsystem, including records of such compensation increases and other recognition, and other related data gathered by other components and/or subcomponents of the EOES system. And, in some embodiments, the control system maintains a plurality of records, for such compensation and recognition related to such an employee and/or agent, and compares it to similar logs created for other employees and/or agents. And, in some such embodiments, the comparison is adjusted per unit of time to create a relative compensation and/or recognition score for that employee and/or agent. And, in some embodiments, the control system assigns an compensation and/or recognition score to the entire business and/or organization, which may be based on a comparison to increases in compensation and recognition occurring at the business and/or organization for groups that have experienced discrimination historically (e.g., in comparison to other, demographically and otherwise similar businesses), in steps 819, 821, 811 and/or 813, in some embodiments.

The control system may also control and normalize any of the above scores for exogenous variables, such as seniority, experience and special skills proven to have been attained by the various agents and/or employees of the business or organization, in step 819. And the control system may also feed results and data into other systems of subsystems, for further processing. For example, microinequities and discriminatory language may be reported as red flags, as discussed above, in step 821.

In some embodiments, the control system may return to the starting position following steps 819, 821, 811 and/or 813.

FIG. 9 depicts another example graphical user interface ("GUI") 901 which may be included in an EOES system, to carry out additional aspects of the present inventions related to virtual whistleblowing, in accordance with some embodiments. Virtual whistleblowing may be defined as any act of an EOES system, or similar computer system, that identifies implicit or explicit bias within communications and actions as shown by documents within the EOES system, and then initiates active interventions to redress that bias, at least in part, by reporting the bias and/or evidence of bias along with supporting documentation, to a person in charge of human resources at the business.

As pictured, in some embodiments, GUI 901 includes an alert section 903, in some embodiments, and including detailed written information, such as the example shown as detailed information 905, regarding bias that has been detected in records regarding communications and/or employment actions at the business.

In some embodiments, a dossier section 907 is also included, which includes a biased action indicator 909 that identifies and emphasizes a communication and/or action, in some embodiments, based on which the EOES system has identified an instance of de facto bias. In some embodiments, dossier section 907 also includes logical statements 911, which may be created by a logic-based AI rule set (e.g., using symbolic reasoning), which support and/or underly the AI's determination that de facto bias exists.

In some embodiments, selectable additional action options 913 are also provided, which allow a user of GUI 901 to create and send additional GUIs to other persons involved, or potentially involved, in the instance of bias.

Figure 10:
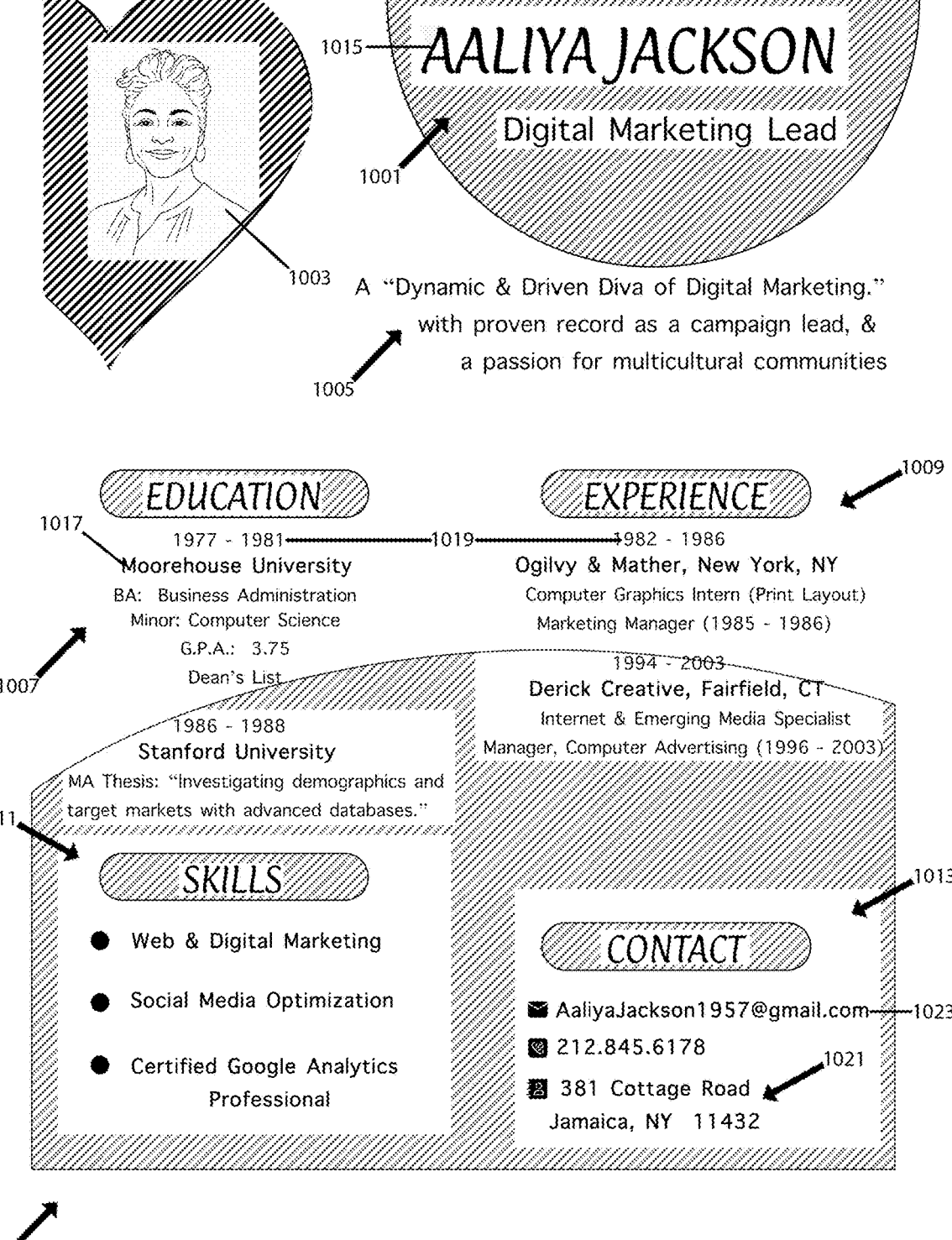
FIG. 10 depicts an example employment application material (namely, an employment candidate's resume) submitted for consideration in gaining employment with an organization and/or business employer using an EOES system, such as any of the example EOES systems discussed in this application.

FIG. 10 depicts an example employment application material 1000 (namely, an employment candidate's resume) submitted for consideration in gaining employment with an organization and/or business employer using an EOES system, such as any of the example EOES systems discussed in this application. As such, application material 1000 represents a variety of information relevant to the position applied for (in this case, a position as a marketing manager for the organization and/or business) including, a name and headline section 1001, a headshot section 1003, a personal statement section 1005, an educational background section 1007, a work history/experience section 1009, a special skills section 1011, and a contact information section 1013, in some embodiments.

As may be apparent, the candidate pictured within headshot section 1003 may appear to be of African descent to some viewers, having dark skin, African jewelry, and other features which tend to indicate that ethnographic background. It also may be apparent to some viewers that she is over the age of 40, due to having mostly gray hair, for example. Similarly, her name 1015 may tend to indicate a person of an African or African American background to a reader. Within education background section 1007, the university title 1017 of one of the educational institutions which the candidate is indicated as having attended is one that historically has served more African Americans, proportionately, than most other universities in the United States. Also, her reported years of attendance, in the timeline sections 1019, at multiple universities, tend to indicate an age over 40, just as her headshot does.

Similarly, her reported address 1021, within the contact information section 1013 is from a geographic area and/or neighborhood that may be more commonly lived in by members of minority groups than other geographic areas and/or neighborhoods. Even her reported e-mail address 1023 also tends to indicate an age over 40, because people tend to add four numbers to their name corresponding with their date of birth when their email needs to be disambiguated from that of a person with the same name.

In addition, although not definitive, the language used in her personal statement section 1005 may indicate usage emblematic, or at least correlated, with her ethnographic background. As a result of all of the above demographically indicative features, and although each may be of limited if any relevance to a hiring decision in some respects, a hiring manager, recruiter or other human resources professional will very likely deduce the candidate's ethnographic background and age.

Figure 11:
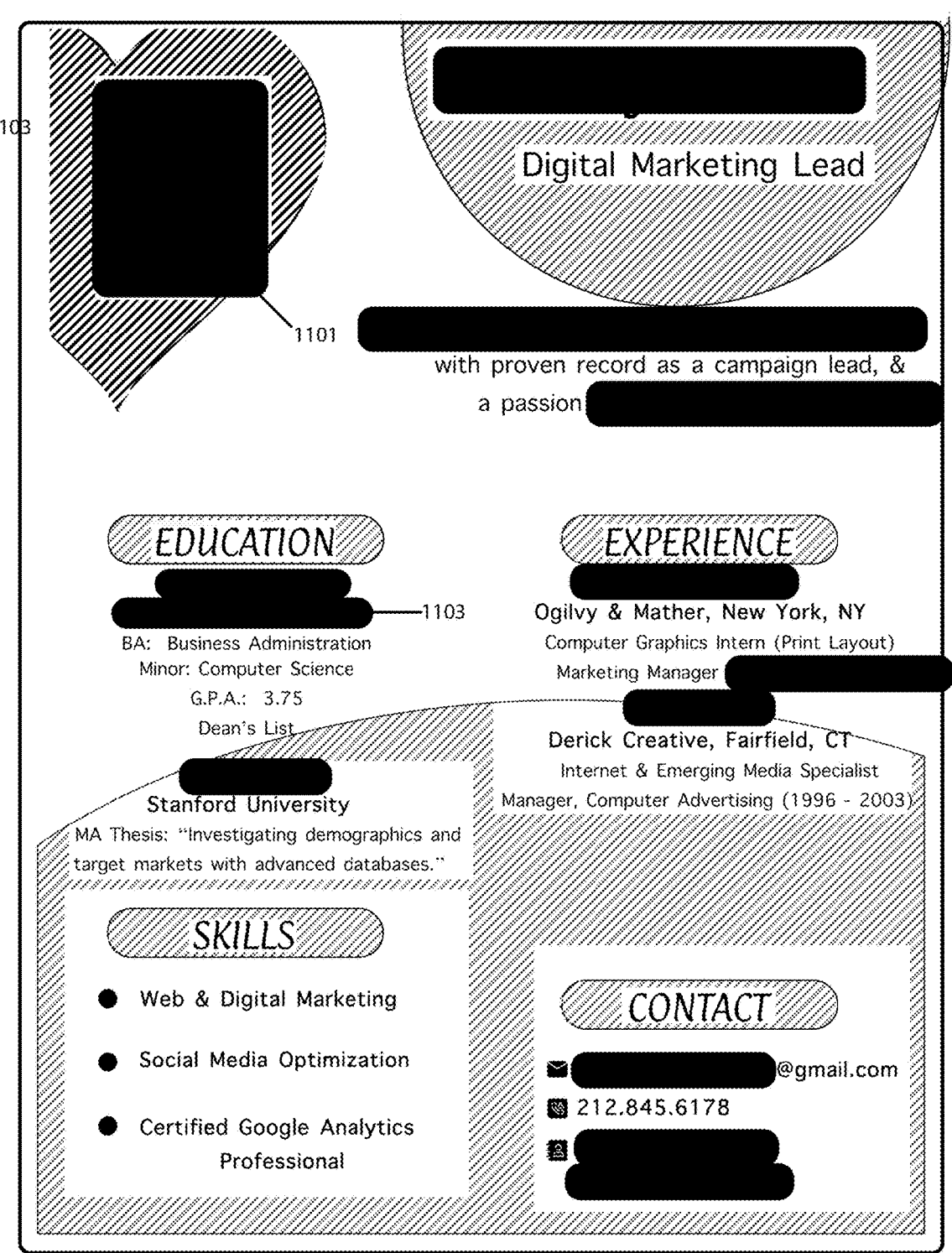
FIG. 11 depicts another example GUI, including various tools and sub-tools for eliminating the potential for bias in reviewing employment application materials, in accordance with some embodiments.

FIG. 11 depicts another example GUI 1100, including various tools and sub-tools for eliminating the potential for bias in reviewing employment application materials, in accordance with some embodiments. GUI 1100 includes a presentation of aspects of employment application material 1000, submitted for consideration in gaining employment with an organization and/or business employer using an EOES system, such as any of the example EOES systems discussed in this application. However, the presentation of many, if not all, of the demographically indicative features has been greatly altered, in accordance with aspects of the present application. For example, in place of the headshot, a dark box 1101 has now been placed, at least over features that tend to indicate the ethnographic background of the candidate.

However, in some embodiments, although not pictured, such features may be replaced by alternative features, which do not indicate that ethnographic background. For example, in some embodiments, any one of, or all of, the candidate's face, clothing, skin color, skin appearance, features, jewelry, statement pieces (such as college signs or T-shirts) may be selectively replaced (e.g., via a clone-stamping tool and perspective overlay tool, or AI implementation thereof, using an AI algorithm for selecting information and indicators to be so overlaid, based on a neural network and/or LLM trained on information identified as indicating ethnographic backgrounds and/or resulting in bias) with alternative images that do not indicate the candidate's ethnographic background or age. Similarly, other dark boxes are now also included, such as school name redaction box 1103, redacting the name of the historically African American university attended by the candidate. And similarly, in some embodiments, rather than a black box, and alternative school identifier, indicating another university of comparable reputation, may be used to replace the candidate's school name, making the redaction undetectable by an HR manager reviewing GUI 1100.

In some embodiments, an HR subsystem of an EOES system in accordance with the present application may apply redaction and replacement techniques to any other employment candidate data or materials used in hiring and employment decisions. Examples of such alterative data or materials, and their treatment, among other things, are discussed elsewhere in this application, for example, below, in reference to FIG. 12.

In some embodiments, such an HR subsystem and/or an EOES system may include a bias reduction sub-system, for the hiring of employees or other agents, from a pool of employment candidates, which may output one or more GUIs like the example GUI 1100. As with other systems and sub-systems of an EOES system, such a bias reduction sub-system may include a control system including specialized computer hardware and software, in some embodiments, which may be similar to or the same as the example control system(s) set forth in reference to FIG. 4, above, in some embodiments. And, as with other sub-systems of an EOES system and control systems set forth in this application, in some embodiments, such a bias reduction sub-system may include communications hardware, comprising at least one network connection, in some such embodiments, such as, for example, the example communication connections 105 and monitoring connections 223, as discussed above. And, in some embodiments, the bias reduction sub-system may include one or more data repositories storing and accessing employment documents, data and information, which may be included in the bias reduction system and/or accessible by such network connections. For example, in some embodiments, such data repositories include one or more employment candidate data repositor(ies), comprising an employment application pool. Generally speaking, such an employment pool may be configured to separately store employment applications and related documents and other information provided by one or more employment candidates, in some embodiments.

In some embodiments, such a bias reduction sub-system includes a specialized hardware and software scanning and processing module for scanning and processing employment applications and documents. In some embodiments, such a module includes software which, when executed, causes the control system to scan employment applications and related documents, for example, using an optical scanner and method for recognizing text characters, in some embodiments. Once recognized and recorded, in some embodiments, the control system proceeds to determine whether any text so recognized and recorded potentially identifies a candidate associated with the application and related documents as belonging to a class of persons historically subjected to discrimination, either at the business that owns the EOES system, or, in some embodiments, elsewhere (e.g., within the United States). Such character scanning, recognition and recording techniques may include any such techniques known in the art, such as, but not limited to, Optical Character Recognition (OCR), Intelligent Character Recognition (ICR), Optical Mark Recognition (OMR) and/or code scanning and recognition technologies (e.g., bar code scanning technologies and methods). In some embodiments, a library of words, phrases, terms, dates of life activities and physical features which indicate such a potential identity may be included within, or in connection with, the bias reduction sub-system. In some embodiments, such a library may be built, at least in part, with the aid of an artificial intelligence subsystem of the bias-reduction sub-system, which may include a neural network and/or an LLM, and which may be trained on a set of employment applications and other employment-related documents determined to be submitted by persons belonging to such groups. However, in some embodiments, such a library of words, phrases, terms, dates of life activities, and physical features may be entered by direct data entry. Based on any of the recognized characters forming such words, phrases and/or terms, the control system may identify those characters as so identifying the candidate's status as belonging to such a group ("group status") and may proceed to redact and/or otherwise alter those characters to remove an indication of the candidate's group status. For example, aside from, or in addition to, redaction, the control system may select alternative characters, which suit the context of the characters so identified, but which do not indicate such a group status. As an example, in place of the name "Aaliya," which may be identified as potentially identifying the candidate as belonging to a racial minority and as a female in the United States, the bias reduction sub-system may substitute the name "Alex" or "Adrian," among innumerable other race- and gender-neutral possibilities.

In some embodiments, the scan and process undertaken by the bias reduction sub-system to identify matter that identifies a candidate's group status may be a multivariate scan and process, in the sense that matter other than text may be so identified. For example, in some embodiments, such a scan and process include at least one pictorial process. For example, in some embodiments, the bias reduction subsystem includes an employment materials alteration module, including a document region designator, which performs a superficial scan of a document for major separate visible regions, based on region-identifying features (e.g., a border, separation line, or other indicator of a non-textual photograph, symbol or other feature) of the document. Once such a separate, non-textual region has been identified, a visual feature analyzing sub-module of the employment materials alteration module is then started, which proceeds to identify physical features of the document within such regions, which match or correlate with the physical features stored in the library. And, based on this other visual variable, the candidate may be identified as having such a group status, in some embodiments.

Generally speaking, in some embodiments, the employment materials alteration module removes information indicating a candidate's group status within said employment application and related documents and information provided by the candidate, and overlays different information, which matches the context of the application and related documents, but is false (although not material to a hiring decision), and does not indicates candidate's status belonging to one or more ethnographic groups that has been the subject of bias, historically.

Figure 12:
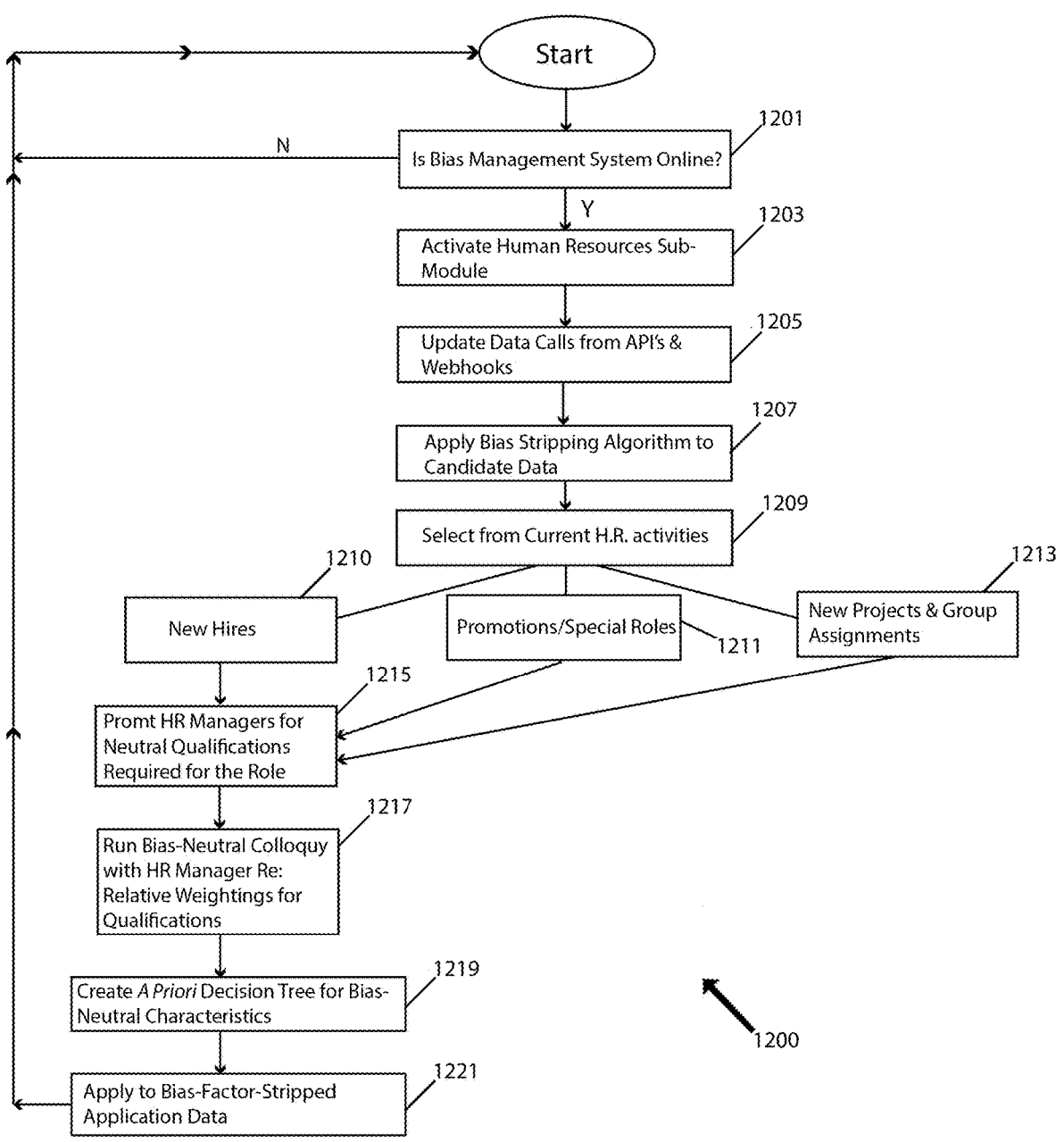
FIG. 12 is an example process flow diagram, illustrating some example steps that may be undertaken by a control system, such as the example control system provided in reference to FIG. 4, above, including and/or included within an EOES system and implementing bias reduction aspects of the present application, in accordance with some embodiments.

FIG. 12 is an example process flow diagram, illustrating some example steps 1200 that may be undertaken by a control system, such as the example control system provided in reference to FIG. 4, above, including and/or included within an EOES system and implementing bias reduction aspects of the present application, in accordance with some embodiments.

Beginning with step 1201, in some embodiments, the control system may begin by determining whether a bias reduction subsystem and/or software module is available and activated (executable by the EOES system). If so, the control system may proceed to step 1203, in which it may also activate an HR subsystem of the EOES system, as discussed elsewhere in this application. As so discussed, in some embodiments, the EOES system may include network and other communications connections with a wide variety of sub-components and external resources, for example, through API calls and/or webhooks, in step 1205, to support the various bias-related determinations, KPIs and scores discussed in this application. Next, the control system may proceed to step 1207, in which it applies a bias redaction and overlay algorithm, such as the AI algorithm for selecting information and indicators to be redacted and/or overlaid discussed above, to candidates' application and employment related materials, prior to their review by a human resources professional.

Following that, in subsequent step 1209, the control system may proceed to enter a mode of execution in which it selects from a plurality of possible HR-related activities requiring, or at least benefiting from, steps 1201 through 1207, discussed above, as precursors and neutral data sources. And, in some embodiments, each of the plurality of modes may involve an aspect of the control system acting as an independent agent and HR authority, based on an AI subcomponent, such as the AI subcomponents discussed above in this application.

For example, in some embodiments, the control system proceeds to enter a hiring mode in step 1210, in which the control system evaluates one or more employment candidate's suitability for one or more employment positions available at the business and/or organization in which the EOES system is being implemented. Alternatively, in some embodiments, the control system proceeds to step 1211, in which it enters a mode for making promotion and special role decisions, with respect to employees and agents already with the company and/or organization. As another example, in some embodiments, the control system proceeds to step 1213, in which it enters a mode for making assignments of employees and/or agents to particular groups of people and projects at the company and/or organization. In each of the above modes, the control system accesses different informational sets and AI algorithms (e.g., based on a neural network and/or LLM) relevant to and trained on data and materials related to those different, unique decisions. For example, data and materials that have been related to successfully outcomes in promotions and special assignments may be labeled as a positive outcome for such a neural network and LLM during training.

In any event, regardless of the particular mode the control system enters, it may next proceed to step 1215, in which it may, based on such a neural network and LLM, generate a plurality of factors determined to be most important in making a successful and unbiased HR decision in that context. And, in some embodiments, that plurality of factors, and their ranking, may be shared with HR professionals, to aid them in making unbiased, relevant hiring decisions. In some embodiments, the control system may go further, in step 1217, to engage in a colloquy with such an HR professional (e.g., through any of the chatbot features set forth in the present application) to 1) teach such factors, and their relative importance, and 2) to determine whether the HR manager is using other, less appropriate factors, in making hiring decisions—for example, by using question funnel, exploring the motivations for the HR professional's employment-related decisions of the nature involved in the particular mode.

In some embodiments, the control system may generate a decision tree, in step 1221, ranking factors as prerequisites, and then by importance, for the candidate to be qualified for the employment position contemplated. And, by applying the decision tree in step 1223, to each candidate, an AI agent subcomponent of the control system may automatically select the most suitable candidate, based on available data, information and materials, and without the influence of bias (which has been redacted or replaced, as discussed above) thereby providing opportunities for employment and career advancement to current employees and/or other persons best suited for a position based on their qualifications.

The control system may then return to the starting position.

Figure 13:
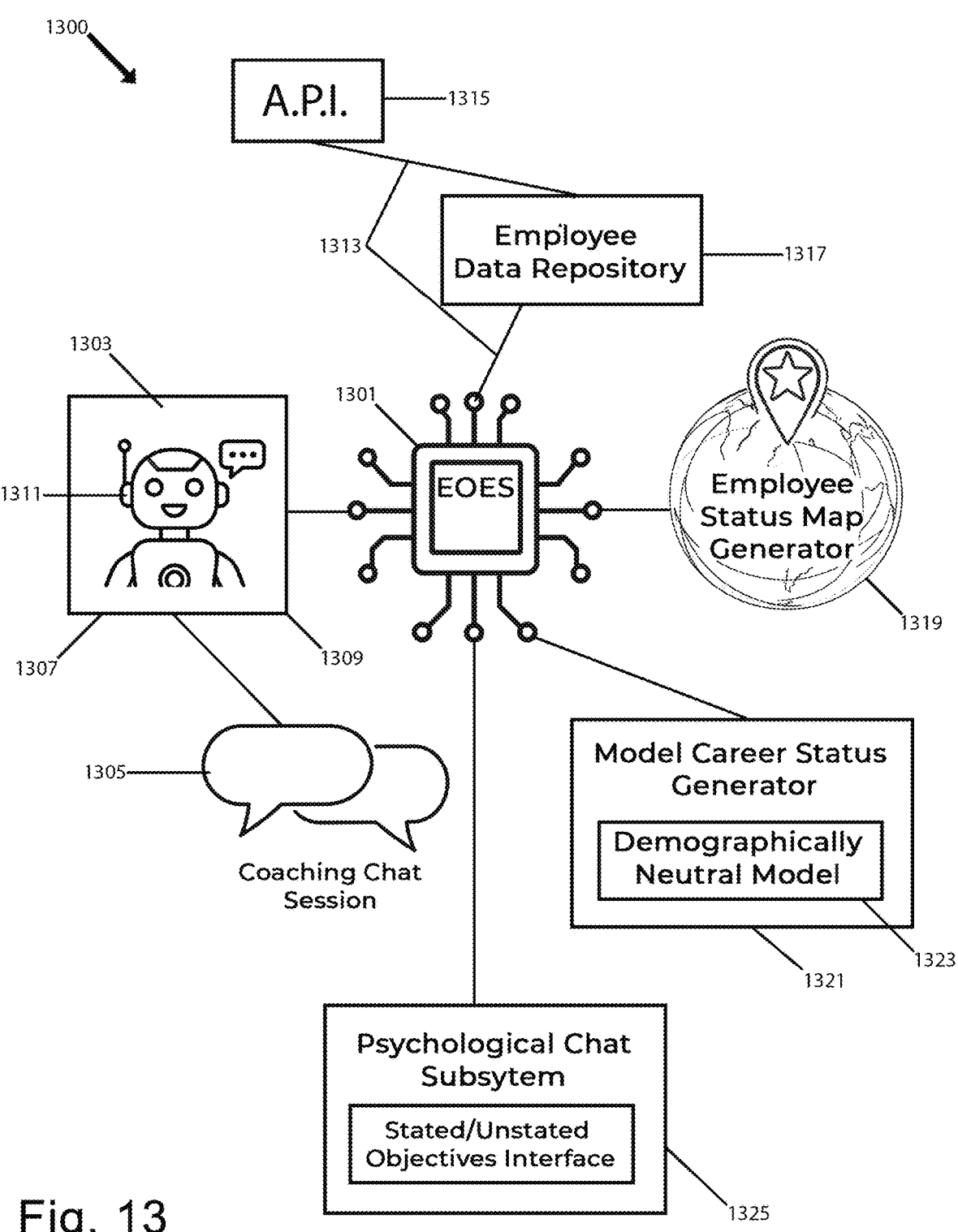
FIG. 13 depicts an example implementation environment for an EOES system including an AI-based chatbot, or other colloquy generating AI subsystem, features of which aid in the career development of agents of a business or other organization in which the EOES system is implemented, in accordance with some example embodiments of the invention(s).

FIG. 13 depicts an example implementation environment 1300 for an EOES system 1301 including an AI-based chatbot, or other colloquy generating AI subsystem 1303, features of which aid in the career development of agents of a business or other organization in which the EOES system is implemented, in accordance with some example embodiments of the invention(s).

As discussed above, in some embodiments, generally speaking, such an AI subsystem implements interviewing techniques via by generating questions, calls to action and statements and other colloquy 1305, and posing them to users via dynamic script generation and a text-to-speech subsystem, and by analyzing candidate's responses and other verbal interactions by a speech-to-text subsystem and text analysis subsystem. In some embodiments, the chat-bot, or other colloquy generating AI subsystem 1303, is implemented, at least in part, on a local computer system 1307, including a display 1309 which may include an avatar 1311 representing a coaching figure, providing an anthropomorphic representation of the chatbot or other colloquy generating AI sub-system.

As discussed elsewhere in this application, in some such embodiments, such a colloquy generating AI sub-system includes an algorithm creating one or more inquiries, including questions, calls to action and statements, put to employers and employees, to aid in identifying the presence of unfair bias and opaqueness in employment opportunity based on past equal opportunity indicating language and sentiment analysis. And, as with other colloquy-generating AI subsystems set forth in the present application, in some such embodiments, the algorithm may be determined and modified by an LLM based on training and experience, which may determine the identity and weighting of relevant variables for such an algorithm. However, in the present figure, such inquiries relate to an individual employee or other agent, and not exclusively to the presence or absence of bias and equal opportunity at the workplace, although this will be one of several subjects discussed in the colloquy. In some embodiments, the user subject to the colloquy with the chat-bot may then provide responses, such as by selecting one or more example response indicators. And, in some embodiments, the chat-bot provides additional questions, calls to action and statements to the user which are created in real time, based on the responses provided by the user.

As also discussed elsewhere in this application, in some embodiments, an EOES system aids in establishing an employment practice known as "right-placing," meaning that the most suitable candidates for a position, apart from any irrelevant demographic considerations, are being successfully placed in that position. And, in some embodiments, such an EOES system aids in establishing an employment practice known as "specific cultivation," cultivating fulfilling growth opportunities for employees and employers alike, and cultivating the development of employees in ways that are increasingly specific to individual employee and employer needs. In some embodiments, colloquy generating AI subsystem 1303 may aid in both right-placing and specific cultivation, through unique techniques implementing a colloquy to coach the individual employee and/or other agent, as discussed further herein.

In some embodiments, EOES system 1301 and colloquy generating AI subsystem 1303 are connected for communications (e.g., via communications connections, such as example communication connections 1313) with additional resources, including, for example, external software platforms, via API calls 1315, and maintains one or more information repository(ies) 1317, in which data concerning the employee or other agent is developed and stored, as a resource for implementing employment-related coaching techniques, in some embodiments. Based on the data, materials and information developed and maintained within the information repository(ies) 1317, in some embodiments, the EOES system 1301 and colloquy generating AI subsystem 1303 generate a map 1319 representing the current employment situation of the employee or other agent subject to coaching, including all aspects of their current status.

Next, in some embodiments, EOES system 1301 and colloquy generating AI subsystem 1303 include a model generating component 1321 generating a model example 1323 of the position and status of an employee or other agent having the same credentials, experience, education, and all other unbiased factors relevant to the employee or agent, based on ideals and/or averages developed by the EOES system 1301 and colloquy generating AI subsystem 1303 under those circumstances. In some such embodiments, such ideals are based on aspirational standards, for example, in excess of the 80th percentile for similarly situated employees or other agents, meaning that the model status is a high goal or "reach," but also proven to be attainable for someone of the employee or other agent's background. In some embodiments, the EOES system 1301 and colloquy generating AI subsystem 1303 compare the model example 1323 to the map 1319, and identify shortfalls in the employee or other agent's performance or status, in some embodiments, by utilizing the neural network. The EOES system 1301 and colloquy generating AI subsystem 1303 then provide targeted advice to address the shortfall(s) with steps and improvements shown to move individuals toward improving such shortfalls historically, as indicated by training and labeling data of other employees and/or other agents.

In some embodiments, the EOES system 1301 and colloquy generating AI subsystem 1303 use techniques other than comparisons and redressing shortfalls to improve employment outcomes. For example, in some embodiments, the EOES system 1301 and colloquy generating AI subsystem 1303 not only determine the employee or other agent's current position and statuses at the company or other organization, but also determine, via a subject matter funnel-type colloquy, the employee's latent and actual desired position and statuses, not only at the company or other organization, but generally in the workforce as a whole. For example, in some embodiments, the EOES system 1301 and colloquy generating AI subsystem 1303 first ask questions directly related to the employee or other agent's status, such as the length of time in their current position, and the title of that position. And, in some embodiments, the EOES system 1301 and colloquy generating AI subsystem 1303 may determine or cross-check that information through other sources (e.g., using API calls 1315).

However, in some embodiments, by implementing the AI subsystem may elicit information that may seem unrelated to the employee or other agent's position, but which has been highly correlated with successful outcomes for persons in that position, or other, related or unrelated positions. For example, based on any of the neural networks set forth in the present application, the EOES system 1301 and colloquy generating AI subsystem 1303 may determine that a principal factor for a person's success as building engineer is enjoying outdoor activities, which actually would seem logically contradictory for a job involving CAD drawing indoors. Thus, by eliciting questions related to the candidates most enjoyed activities, and whether those are outdoor activities, the EOES system 1301 and colloquy generating AI subsystem 1303 may determine whether the employee or other agent is likely to succeed in that position, as one example of the potentially unlimited, seemingly unrelated interests indicating a suitable and even latently desired career, within psychological chat subsystem 1325.

What is claimed is:

1. An alert and intervention system, comprising:
a control system, comprising:
communications hardware, comprising at least one network connection;

a communications monitoring subsystem, comprising:
surveillance connection(s) to a plurality of communications systems of an entity capable of recording data present in communications over said communications systems; and
a transcription and classification module, generating and summarizing one or more transcripts of said communications over said communications systems, and defining different types of data present in said communications over said communications systems; and
a red flag generator, configured to generate one or more red flags, triggering the generation of one or more additional, actionable GUI tool(s) in reaction to human language within said communications over said business communications systems;
a bias warning subsystem, comprising:
a demographics engine, comprising a plurality of separate data repositories, each comprising separate, dedicated and encrypted files comprising data and indicators based on linguistic data gathered by the system, comprising:
1) A first repository, configured to develop and store data related to treatment of employees labelled as belonging to a group of persons which has historically been subjected to discrimination, 2) a second repository, configured to develop and store data related to treatment of employees not labelled as belonging to a group of persons which has historically been subjected to discrimination, and 3) at least one third repository(ies), each configured to develop and store data related to a current, separate employee of the business; and
a multi-modal AI comparer subsystem;
wherein said repositories include human resources decisions and other data related to said employees not labelled as belonging to a group of persons which has historically been subjected to discrimination; and
wherein said human resources management system generates at least one alert regarding potential bias based on a correlation between aspects of said human resources decisions and other data related to the treatment of employees labelled as belonging to a group of persons which has not historically been subjected to discrimination not matching one or more decision(s) evidenced by a new communication over said communications systems of said entity, based on a scan and comparative output by said multi-modal AI comparer subsystem;
wherein said separate, dedicated and encrypted files comprise linguistic data based on at least some of said communications from the current, separate employee, which is correlated by said multi-modal AI comparer subsystem with a particular group status.

2. The alert and intervention system of claim 1, comprising a fourth repository, which is a bias-indicating language repository, wherein the red flag generator generates the one or more red flag(s) in reaction to detecting language that substantially matches language recorded in said fourth, bias-indicating language repository.

3. The alert and intervention system of claim 2, wherein the one or more additional, actionable GUI tool(s) is a decision review and revision tool.

4. The alert and intervention system of claim 3, wherein the control system takes further action(s) based on said one or more red flag(s) and actuation of a sub-tool of said decision review and revision tool, comprising altering a past decision and/or creating additional records concerning said past decision.

5. The alert and intervention human resources management system of claim 1, wherein said illegal bias warning subsystem comprises a warning generator, configured to generate a warning when said multi-modal AI comparer subsystem's comparative output determines that demographics resulting from said decision do not meet, exceed or reflect progress toward a demographic target.

6. The alert and intervention system of claim 4, wherein the control system prevents any negative alteration of said past decision.

7. The alert and intervention system of claim 6, wherein the control system requires the positive alteration of said past decision.

8. The alert and intervention system of claim 1, comprising an application programming interface (API).

9. The alert and intervention system of claim 1, wherein the multi-modal AI comparer subsystem comprises an LLM.

10. The alert and intervention system of claim 9, wherein the LLM is trained on said data within said first repository, related to treatment of employees labelled as belonging to a group of persons which has historically been subjected to discrimination, and by said data within said second repository, related to treatment of employees not labelled as belonging to a group of persons which has historically been subjected to discrimination.

11. The alert and intervention system of claim 1, wherein the one or more additional, actionable GUI tool(s) comprise(s) a decision investigation tool, comprising a specialized investigative GUI prompting and requiring entry of a reason not related to improper demographic considerations.

12. The alert and intervention system of claim 11, wherein the control system prompts the administrative user with a secure user login and authentication challenge and another form of authentication, as a second factor authentication, before presenting a GUI for use.

13. The alert and intervention system of claim 11, wherein the control system presents a biometric challenge prior to presenting said GUI tool(s).

14. The alert and intervention system of claim 12, wherein the control system presents a biometric challenge prior to presenting said GUI tool(s).

15. The alert and intervention system of claim 14, wherein the control system performs a test for prevarication comprising a measurement of hesitation prior to actuating an aspect of said GUI tool(s).

16. The alert and intervention system of claim 15, wherein the aspect of the GUI tool(s) includes a data entry window comprising a field for entry of a primary reason for taking an action.

17. The alert and intervention system of claim 15, comprising an initial rationale request tool, and wherein the initial rationale request tool is available for a limited time, and provides a display of elapsed time.

18. The alert and intervention system of claim 1, wherein said communications monitoring subsystem creates a faithful recording, in addition to a transcript and transcript summary, for each of said communications, in a location other than said first repository or second repository.

19. The alert and intervention system of claim 15, wherein said communications monitoring subsystem creates and stores metadata regarding contents of the communications in an additional communications repository.

20. The alert and intervention system of claim 11, wherein the control system performs a test for prevarication comprising a measurement of hesitation prior to actuating an aspect of said GUI tool(s).

* * * * *